United States Patent
Martin et al.

(10) Patent No.: US 7,808,488 B2
(45) Date of Patent: *Oct. 5, 2010

(54) METHOD AND APPARATUS FOR PROVIDING TACTILE SENSATIONS

(75) Inventors: Kenneth M. Martin, Los Gatos, CA (US); Steven P. Vassallo, Redwood City, CA (US); Alex S. Goldenberg, Portola Valley, CA (US); Alexander Jasso, Los Altos, CA (US); Kollin Tierling, Milpitas, CA (US)

(73) Assignee: Immersion Corporation, San Jose, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/693,117

(22) Filed: Mar. 29, 2007

(65) Prior Publication Data
US 2007/0229455 A1    Oct. 4, 2007

Related U.S. Application Data

(63) Continuation of application No. 10/285,450, filed on Nov. 1, 2002, now Pat. No. 7,336,260.

(60) Provisional application No. 60/335,493, filed on Nov. 1, 2001, provisional application No. 60/399,883, filed on Jul. 31, 2002.

(51) Int. Cl.
*G09G 5/00* (2006.01)
(52) U.S. Cl. ........................ 345/169; 345/156
(58) Field of Classification Search ................ 345/156, 345/161, 163, 173, 167–169
See application file for complete search history.

(56) References Cited

U.S. PATENT DOCUMENTS 2,972,140 A    2/1961    Hirsch (Continued)

FOREIGN PATENT DOCUMENTS

EP    0349086    1/1990

(Continued)

OTHER PUBLICATIONS

Adelstein, "A Virtual Environment System For The Study of Human Arm Tremor," Ph.D. Dissertation, Dept. of Mechanical Engineering, MIT, Jun. 1989.

(Continued)

*Primary Examiner*—Ricardo L Osorio
(74) *Attorney, Agent, or Firm*—Kilpatrick Stockton LLP

(57) ABSTRACT

Products and processes for providing tactile sensations to input devices or electronic devices are provided. Input devices include mechanical input devices (such as, for example, mechanical switches) and non-mechanical input devices (such as, for example, touchpads). Tactile feedback is provided by using an actuator or other means in communication with the input device or electronic device. A controller may be employed to receive signals from the input devices and control the actuator. Tactile feedback to an input device or electronic device may be provided in response to one or more events or situations. Such an event or situation may be any one designated. Examples of such events and situations include the level of pressure placed on an input device; the availability or lack of availability of a function associated with an input device; and the function, menu, or mode of operation associated with an input device's activation. A variety of feedback types and combinations may be selected.

29 Claims, 11 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salisbury, Jr. et al. |
| 4,236,325 A | 12/1980 | Hall et al. |
| 4,262,549 A | 4/1981 | Schwellenbach |
| 4,311,980 A | 1/1982 | Prudenziati |
| 4,333,070 A | 6/1982 | Barnes |
| 4,362,408 A | 12/1982 | Cordes et al. |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |
| 4,581,972 A | 4/1986 | Hoshino |
| 4,599,070 A | 7/1986 | Hladky et al. |
| 4,692,756 A | 9/1987 | Clark |
| 4,708,656 A | 11/1987 | De Vries et al. |
| 4,713,007 A | 12/1987 | Alban |
| 4,725,817 A | 2/1988 | Wihlborg |
| 4,791,416 A | 12/1988 | Adler |
| 4,794,392 A | 12/1988 | Selinko |
| 4,795,296 A | 1/1989 | Jau |
| 4,798,919 A | 1/1989 | Miessler et al. |
| 4,821,030 A | 4/1989 | Batson et al. |
| 4,823,106 A | 4/1989 | Lovell |
| 4,840,634 A | 6/1989 | Muller et al. |
| 4,885,565 A | 12/1989 | Embach |
| 4,891,764 A | 1/1990 | McIntosh |
| 4,930,770 A | 6/1990 | Baker |
| 4,934,694 A | 6/1990 | McIntosh |
| 4,982,918 A | 1/1991 | Kaye |
| 4,983,786 A | 1/1991 | Stevens |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,053,585 A | 10/1991 | Yaniger |
| 5,078,152 A | 1/1992 | Bond |
| 5,116,051 A | 5/1992 | Moncrief et al. |
| 5,165,897 A | 11/1992 | Johnson |
| 5,175,459 A | 12/1992 | Danial et al. |
| 5,182,557 A | 1/1993 | Lang |
| 5,186,695 A | 2/1993 | Mangseth et al. |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,241,308 A | 8/1993 | Young |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce et al. |
| 5,309,140 A | 5/1994 | Everett |
| 5,334,027 A | 8/1994 | Wherlock |
| 5,355,148 A | 10/1994 | Anderson |
| 5,390,128 A | 2/1995 | Ryan et al. |
| 5,390,296 A | 2/1995 | Crandall et al. |
| 5,402,499 A | 3/1995 | Robison et al. |
| 5,402,680 A | 4/1995 | Korenaga |
| 5,436,622 A | 7/1995 | Gutman et al. |
| 5,437,607 A | 8/1995 | Taylor |
| 5,451,924 A | 9/1995 | Massimino et al. |
| 5,461,711 A | 10/1995 | Wang et al. |
| 5,466,213 A | 11/1995 | Hogan et al. |
| 5,489,812 A | 2/1996 | Furuhata et al. |
| 5,496,174 A | 3/1996 | Garner |
| 5,514,150 A | 5/1996 | Rostoker |
| 5,521,336 A | 5/1996 | Buchanan et al. |
| 5,547,382 A | 8/1996 | Yamasaki et al. |
| 5,575,761 A | 11/1996 | Hajianpour |
| 5,631,861 A | 5/1997 | Kramer |
| 5,684,722 A | 11/1997 | Thorner et al. |
| 5,691,747 A | 11/1997 | Amano |
| 5,709,219 A | 1/1998 | Chen et al. |
| 5,729,249 A | 3/1998 | Yasutake |
| 5,766,016 A | 6/1998 | Sinclair et al. |
| 5,767,457 A | 6/1998 | Gerpheide et al. |
| 5,785,630 A | 7/1998 | Bobick et al. |
| 5,791,992 A | 8/1998 | Crump et al. |
| 5,844,392 A | 12/1998 | Peurach et al. |
| 5,857,986 A | 1/1999 | Moriyasu |
| 5,887,995 A | 3/1999 | Holehan |
| 5,889,670 A | 3/1999 | Schuler et al. |
| 5,889,672 A | 3/1999 | Schuler et al. |
| 5,917,906 A | 6/1999 | Thornton |
| 5,943,044 A | 8/1999 | Martinelli et al. |
| 5,945,772 A | 8/1999 | Macnak et al. |
| 5,977,867 A | 11/1999 | Bouin |
| 5,988,902 A | 11/1999 | Holehan |
| 6,059,506 A | 5/2000 | Kramer |
| 6,078,126 A | 6/2000 | Rollins et al. |
| 6,097,964 A | 8/2000 | Nuovo et al. |
| 6,111,577 A | 8/2000 | Zilles et al. |
| 6,118,435 A | 9/2000 | Fujita et al. |
| 6,131,097 A | 10/2000 | Peurach et al. |
| 6,160,489 A | 12/2000 | Perry et al. |
| 6,195,592 B1 | 2/2001 | Schuler et al. |
| 6,198,206 B1 | 3/2001 | Saarmaa et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,292,173 B1 | 9/2001 | Rambaldi et al. |
| 6,307,465 B1 | 10/2001 | Kayma et al. |
| 6,344,791 B1 | 2/2002 | Armstrong |
| 6,369,803 B2 | 4/2002 | Brisebois et al. |
| 6,373,463 B1 | 4/2002 | Beeks |
| 6,374,255 B1 | 4/2002 | Peurach et al. |
| 6,388,655 B1 | 5/2002 | Leung |
| 6,422,941 B1 | 7/2002 | Thorner et al. |
| 6,429,846 B2 * | 8/2002 | Rosenberg et al. .......... 345/156 |
| 6,543,487 B2 | 4/2003 | Bazinet |
| 6,597,347 B1 | 7/2003 | Yasutake |
| 6,657,617 B2 | 12/2003 | Paolini et al. |
| 6,781,569 B1 | 8/2004 | Gregorio et al. |
| 6,801,191 B2 | 10/2004 | Mukai et al. |
| 6,976,562 B1 | 12/2005 | Perret, Jr. et al. |
| 7,202,851 B2 * | 4/2007 | Cunningham et al. ....... 345/156 |
| 2002/0033795 A1 | 3/2002 | Shahoian et al. |
| 2002/0128048 A1 | 9/2002 | Aaltonen et al. |
| 2002/0149561 A1 | 10/2002 | Fukumoto et al. |
| 2002/0171621 A1 | 11/2002 | Johnson |
| 2002/0177471 A1 | 11/2002 | Kaaresoja et al. |
| 2005/0099393 A1 | 5/2005 | Johnson |
| 2008/0068350 A1 * | 3/2008 | Rosenberg et al. .......... 345/173 |

FOREIGN PATENT DOCUMENTS

| | | |
|---|---|---|
| EP | 0 817 110 | 1/1998 |
| GB | 2 180 342 | 3/1987 |
| JP | 01-003664 | 7/1990 |
| JP | H2-185278 | 7/1990 |
| JP | 02-109714 | 1/1992 |
| JP | H4-8381 | 1/1992 |
| JP | 04-007371 | 8/1993 |
| JP | H5-192449 | 8/1993 |

| | | |
|---|---|---|
| JP | 05-193862 | 1/1995 |
| JP | H7-24147 | 1/1995 |
| JP | 8221173 | 8/1996 |
| JP | 10171586 | 6/1998 |
| JP | 1124834 | 1/1999 |
| JP | 11-085400 | 3/1999 |
| JP | 2001-222379 | 8/2001 |
| JP | 2001-265485 | 9/2001 |
| JP | 2001-290572 | 10/2001 |
| JP | 2001-296950 | 10/2001 |
| JP | 2001-350592 A | 12/2001 |
| JP | 2002-259059 A | 9/2002 |
| JP | 2002-528831 | 9/2002 |
| KR | 2001-0028369 | 4/2001 |
| WO | WO 9520787 | 8/1995 |
| WO | WO 97/18546 A1 | 5/1997 |
| WO | WO 99/49443 | 9/1999 |
| WO | WO 01/54109 | 7/2001 |
| WO | WO 01/91100 A1 | 11/2001 |
| WO | WO 02/27645 | 4/2002 |
| WO | WO 0231807 A1 | 4/2002 |

OTHER PUBLICATIONS

Adelstein, "Design and Implementation of a Force Reflecting Manipulandum for Manual Control research," DSC-vol. 42, Advances in Robotics, Edited by H. Kazerooni, pp. 1-12, 1992.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Bejczy, "Sensors, Controls, and Man-Machine Interface for Advanced Teleoperation," Science, vol. 208, No. 4450, pp. 1327-1335, 1980.

Bejczy, "Generalization of Bilateral Force-Reflecting Control of Manipulators," Proceedings Of Fourth CISM-IFToMM, Sep. 8-12, 1981.

Bejczy, et al., "Universal Computer Control System (UCCS) For Space Telerobots," CH2413-3/87/0000/0318501.00 1987 IEEE, 1987.

Bejczy et al., "A Laboratory Breadboard System For Dual-Arm Teleoperation," SOAR '89 Workshop, JSC, Houston, TX, Jul. 25-27, 1989.

Bliss, "Optical-to-Tactile Image Conversion for the Blind," IEEE Transactions on Man-Machine Systems, vol. MMS-11, No. 1, Mar. 1970.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Cadler, "Design of A Force-Feedback Touch-Introducing Actuator For Teleoperator Robot Control," Bachelor of Science Thesis, MIT, Jun. 23, 1983.

Caldwell et al., "Enhanced Tactile Feedback (Tele-Traction) Using a Multi-Functional Sensory System," 1050-4729/93, pp. 955-960, 1993.

Eberhardt et al., "OMAR—A Haptic display for speech perception by deaf and def-blind individuals," IEEE Virtual Reality Annual International Symposium, Seattle, WA, Sep. 18-22, 1993.

Eberhardt et al., "Including Dynamic Haptic Perception by The Hand: System Description and Some Results," DSC-vol. 55-1, Dynamic Systems and Control: vol. 1, ASME 1994.

Fokumoto, "Active Click: Tactile Feedback For Touch Panels," ACM CHI2001 Extended Abstracts, pp. 121-122, Apr. 2001.

Gobel et al., "Tactile Feedback Applied to Computer Mice," International Journal of Human-Computer Interaction, vol. 7, No. 1, pp. 1-24, 1995.

Gotow et al, "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bullein, "Mouse Ball-Actuating Device With Force and Tactile Feedback," vol. 32, No. 9B, Feb. 1990.

International Search Report filed Nov. 1, 2002 corresponding to PCT/US02/35016.

Iwata, "Pen-based Haptic Virtual Environment," 0-7803-1363-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Johnson, "Shape-Memory Alloy Tactile Feedback Actuator," Armstrong Aerospace Medical Research Laboratory, AAMRL-TR-90-039, Aug. 1990.

Jones et al., "A perceptual analysis of stiffness," ISSN 0014-4819 Springer International (Springer-Vertag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," Presence, 4(4):387-402, 1995.

Lake, "Cyberman from Logitech," GameBytes, 1994.

Marcus, "Touch Feedback in Surgery," Proceedings of Virtual Reality and Medicine The Cutting Edge, Sep. 8-11, 1994.

McAffee, "Teleoperator Subsystem/Telerobot Demonsdtrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Textue for a Force-Feedback Display," Ph.D. Dissertation, MIT, Jun. 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory intensity, frequency, and contractor area," Journal of The Accoustical Society of America, vol. 82, No. 4, Oct. 1987.

Russo, "The Design and Implementation of a Three Degree of Freedom Force Output Joystick," MIT Libraries Archives Aug. 14, 1990, pp. 1-131, May 1990.

Russo, "Controlling Dissipative Magnetic Particle Brakes in Force Reflective Devices," DSC-vol. 42, Advances in Robotics, pp. 63-70, ASME 1992.

Scannell, "Taking a Joystick Ride", Computer Currents, Nov. 1994, Boston Edition, vol. 9 No. 11.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

SMK Corporation, "Multi-Functional Touch Panel, Force-Feedback Type, Developed: A Touch Panel Providing a Clicking Feeling," http://www.smk.co.jp/whatsnew_e/628csc_e.html, Sep. 30, 2002.

SMK Corporation, "Force Feedback Type Optical Touch Panel Developed," SMK Corporation Website, Oct. 30, 2002.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSV-vol. 42, Advances in Robotics, pp. 55-61, ASME 1992.

Tadros, Control System Design for a Three Degree of Freedom Virtual Environment Simulator Using Motor/Brake Pair Actuators, MIT Archive © Massachusetts Institute of Technology, pp. 1-88, Feb. 1990.

Terry et al., "Tactile Feedback In A Computer Mouse," Proceedings of Fourteenth Annual Northeast Bioengineering Conference, University of New Hampshire, Mar. 10-11, 1988.

Wakiwaka, et al., "Influence of Mover Support Structure on Linear Oscillatory Actuator for Cellular Phones," The Third International Symposium on Linear Drives for Industry Applications, 2001, p. 260-263, Nagano, Japan.

Wiker, "Teletouch Display Development: Phase 1 Report," Technical Report 1230, Naval Ocean Systems Center, San Diego, Apr. 17, 1989.

U.S. Office of China Sinda Intellectual Property Ltd., Notification of First Office Action, Chinese Application No. 02821854.X, mailed Sep. 5, 2007.

Japanese Patent Office, Response to Notice of Reasons for Rejection for Jan. 29, 2008, Japanese Patent Application No. 2003-540973, mailed Feb. 20, 2008.

Japanese Patent Office, Notice of Reasons for Rejection of Sep. 11, 2007, Japanese Patent Application No. 2003-540973, mailed Sep. 26, 2007.

United States Patent and Trademark Office, Office Action, U.S. Appl. No. 10/285,450, mailed Dec. 23, 2005.

United States Patent and Trademark Office, Office Action, U.S. Appl. No. 10/285,450, mailed May 18, 2006.

United States Patent and Trademark Office, Office Action, U.S. Appl. No. 10/285,450, mailed Nov. 15, 2006.

United States Patent and Trademark Office, Office Action, U.S. Appl. No. 10/285,450, mailed Jun. 1, 2007.

European Patent Office, Supplemental Search Report, European Application No. 02773960.6, mailed Jul. 1, 2008.

KIPO Notice of Preliminary Rejection, Korean Patent Application No. 10-2004-7006627, mailed Apr. 16, 2009.

Office Action mailed Nov. 25, 2009 for corresponding Korean Application No. 10-2009-7017838.

Office Action mailed Dec. 4, 2009 for corresponding Korean Application No. 10-2004-7006627.

Office Action dated Jun. 19, 2009 for corresponding Chinese Application No. 200810008845.X.

* cited by examiner

| INPUT DEVICE | INPUT SIGNAL | POSITION DATA | PRESSURE DATA | FUNCTION | TACTILE SENSATION |
|---|---|---|---|---|---|
| 1 | -- | Location 1 | < Pressure 1 | Search | Sensation 1 |
| 1 | Input 1 | Location 1 | Pressure 1 <= | Select | Sensation 2 |
| 2 | -- | Position 1 | -- | On | Sensation 3 |
| 2 | -- | Position 2 | -- | Off | Sensation 4 |
| 3 | Input 2A | | Pressure 1 | 9 | Sensation 5 |
| 3 | Input 2B | | Pressure 2 | W | Sensation 6 |
| 3 | Input 2C | | Pressure 3 | X | Sensation 7 |
| 3 | Input 2D | | Pressure 4 | Y | Sensation 8 |
| 3 | Input 2E | | Pressure 5 | Z | Sensation 9 |
| 4 | Input 3 | | Pressure 1 | Menu 1 | Sensation 10 |
| 4 | Input 3 | | Pressure 2 | Menu 2 | Sensation 11 |
| 4 | Input 3 | | Pressure 3 | Menu 3 | Sensation 12 |
| 5 | -- | | Pressure 1 | 2 | Sensation 13 |
| 5 | -- | | Pressure 2 | A | Sensation 14 |
| 5 | -- | | Pressure 3 | B | Sensation 15 |
| 5 | -- | | Pressure 4 | C | Sensation 16 |
| 6 | Input 4 | Position 1 | Pressure 1 | Function 1 | Sensation 17 |
| 6 | Input 5 | Position 2 | Pressure 2 | Function 2 | Sensation 18 |
| 6 | Input 6 | Position 3 | Pressure 3 | Function 3 | Sensation 19 |
| 7 | Input 7 | Location 1 | Pressure 1 | Function 1 | Sensation 20 |
| 7 | Input 8 | Location 2 | Pressure 2 | Function 2 | Sensation 21 |
| -- | AMBIGUOUS | -- | -- | -- | Sensation 22 |
| -- | Function Failure | -- | -- | -- | Sensation 23 |

FIG.9

| INPUT DEVICE | INPUT SIGNAL | POSITION DATA | PRESSURE DATA | FUNCTION | TACTILE SENSATION |
|---|---|---|---|---|---|
| 1 | -- | Location 1 | < Pressure 1 | Search | Sensation 1 |
| 1 | Input 1 | Location 1 | Pressure 1 <= | Select | Sensation 2 |
| 2 | -- | Position 1 | -- | On | Sensation 3 |
| 2 | -- | Position 2 | -- | Off | Sensation 4 |
| 3 | Input 2A | | Pressure 1 | 9 | Sensation 5 |
| 3 | Input 2B | | Pressure 2 | W | Sensation 6 |
| 3 | Input 2C | | Pressure 3 | X | Sensation 7 |
| 3 | Input 2D | | Pressure 4 | Y | Sensation 8 |
| 3 | Input 2E | | Pressure 5 | Z | Sensation 9 |
| 4 | Input 3 | | Pressure 1 | Menu 1 | Sensation 10 |
| 4 | Input 3 | | Pressure 2 | Menu 2 | Sensation 11 |
| 4 | Input 3 | | Pressure 3 | Menu 3 | Sensation 12 |
| 5 | | | Pressure 1 | 2 | Sensation 13 |
| 5 | | | Pressure 2 | A | Sensation 14 |
| 5 | -- | | Pressure 3 | B | Sensation 15 |
| 5 | | | Pressure 4 | C | Sensation 16 |
| 6 | Input 4 | Position 1 | Pressure 1' | Function 4 | Sensation 17' |
| 6 | Input 5 | Position 2 | Pressure 2' | Function 5 | Sensation 18' |
| 6 | Input 6 | Position 3 | Pressure 3' | Function 6 | Sensation 19' |
| 7 | Input 7 | Location 1 | Pressure 1 | Function 1 | Sensation 20 |
| 7 | Input 8 | Location 2 | Pressure 2 | Function 2 | Sensation 21 |
| -- | AMBIGUOUS | -- | -- | -- | Sensation 22 |
| -- | Function Failure | -- | -- | -- | Sensation 23 |

FIG.10

METHOD AND APPARATUS FOR PROVIDING TACTILE SENSATIONS

CROSS-REFERENCES TO RELATED APPLICATION

This application is a continuation of co-pending U.S. patent application Ser. No. 10/285,450 entitled "Method and Apparatus for Providing Tactile Sensations" filed Nov. 1, 2002, which claims priority to U.S. Provisional Application No. 60/335,493, filed Nov. 1, 2001, and U.S. Provisional Application No. 60/399,883, filed Jul. 31, 2002, the entirety of all of which is hereby incorporated by reference.

FIELD OF THE INVENTION

The present invention relates to methods and apparatus for providing tactile sensations.

BACKGROUND

Conventional electronic devices, such as mobile telephones and Personal Digital Assistants (PDAs), include visual displays. A user of such devices interacts with the visual display using any one of a number of input devices. Examples of such input devices include computer mice, joysticks, trackballs, steering wheels, stylus, tablets, pressure-sensitive spheres, scroll wheels, keyboards, and keypads. The user provides instructions, responses, and other input to the device using such input devices.

In conventional mobile telephones and PDAs, confirmation of the input provided by the user is primarily limited to visual or audible confirmation. In some such devices, physical feedback is provided by conventional mechanical switches in the form of the conventional mechanical feedback of switches, for example the switch closure force-displacement profile. Typically, in such devices, the mechanical feedback provided by each button is identical. In addition, in such conventional devices, for those buttons that serve multiple functions, the mechanical feedback generally remains the same regardless of the current function of the button.

In addition to providing extremely limited and rudimentary mechanical confirmation of button selection, conventional buttons as used, for example, in keypads for mobile telephones and PDAs, provide simple passive touch cues regarding the alignment of keys. Such cues include raised bumps on the center key of a telephone keypad or on the "F" and "G" keys of a keyboard that assist a user in orienting to the pattern of keys in the keypad and keyboard. Again, these physical queues are very limited, and users typically need to view a keypad or keypad for visual confirmation that the correct instructions or information is being entered.

When a flat surface interface device is used, such as a touchpad for a computer or PDA, these simple mechanical cues are unavailable to the user. Often, touchpads are combined with flat-panel display screens that display one or more graphically generated buttons or softkeys. Normally, the softkeys are visible through the touchpad. A user's contact with the touchpad in an area defined by a softkey provides the electronic device having the touchpad with the input associated with that softkey.

The use of electronic devices using such conventional mechanical buttons and touchpad arrangements are particularly difficult to use in distracting environments or when the user is attempting to perform another task simultaneously with using the electronic device. For example, if the other task involves operating a motor vehicle or heavy machinery, it may be difficult or impossible for a user to simultaneously use such an electronic device because such devices typically require the user to look at the device, at least briefly, when interacting with the device. In addition, electronic devices relying on softkeys can be difficult to read in bright light environments such as in bright sunlight and can contain very small fonts and graphics that are difficult to read and select.

Some conventional touchpads include vibratory feedback to the user of the touchpad. U.S. Pat. No. 5,977,867 is one example. Such conventional systems and methods are limited, though. They lack a full range of functionality assistance to a user interacting with an electronic device. Moreover, such systems and methods still require considerable visual attention from the user.

SUMMARY

The present invention comprises products and processes for providing tactile sensations to input devices or electronic devices. Input devices include mechanical input devices (such as, for example, mechanical switches) and non-mechanical input devices (such as, for example, touchpads). Tactile feedback is provided by using an actuator or other means in communication with the input device or electronic device. A controller may be employed to receive signals from the input devices and to control the actuator. Tactile feedback to an input device or electronic device may be provided in response to one or more events or situations. Such an event or situation may be any one designated. Examples of such events and situations include the level of pressure placed on an input device; the availability or lack of availability of a function associated with an input device; and the function, menu, or mode of operation associated with an input device's activation. A variety of feedback types and combinations may be selected. Mobile telephones and PDAs benefit from employing such products and processes, but other devices benefit as well. The advantages offered by the various embodiments of the present invention may be understood by examining this specification.

BRIEF DESCRIPTION OF THE DRAWINGS

FIG. 9 is a table illustrating a first set of data to be used in one embodiment of the present invention;

FIG. 10 is a table illustrating a second set of data to be used in another embodiment of the present invention.

DETAILED DESCRIPTION

The present invention includes methods and systems for providing tactile sensations. One embodiment includes methods and systems for providing tactile sensations to input devices, both mechanical and non-mechanical (for example soft-keys that are computer generated and displayed on a screen). Embodiments of the present invention can be utilized in wide variety of electronic devices including telephones, mobile telephones, remote controls, gamepads, joystick handles, automotive controls (radios, Compact Disc (CD) players, automobile functions, etc.), consumer electronics devices, Personal Digital Assistants (PDAs), personal computers, laptop computers, portable gaming devices, pagers, I-pagers, audio equipment, televisions, security or alarm systems, Automated Teller Machines (ATM), calculators, home appliances, and white goods.

Figure 1:
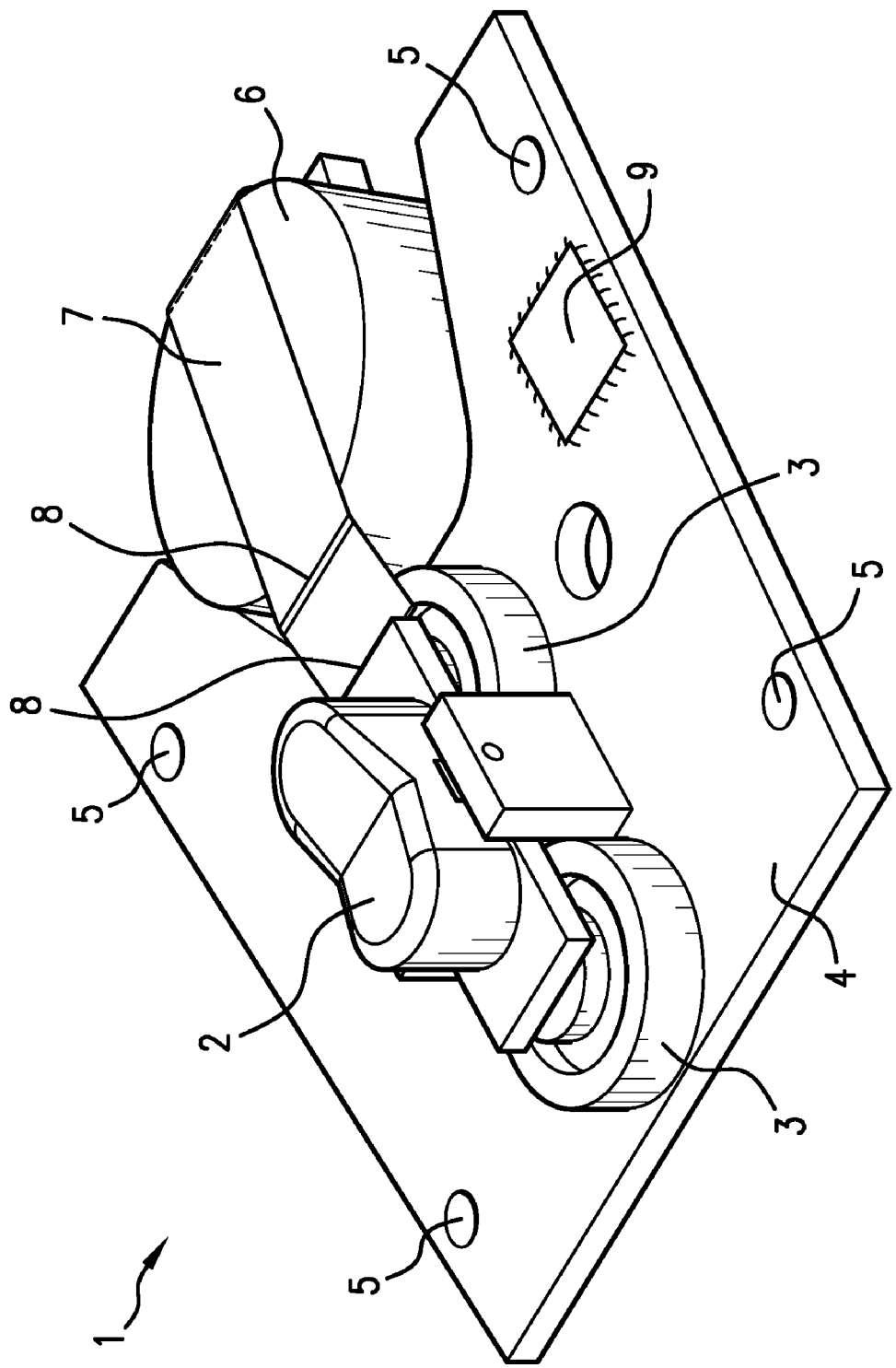
FIG. 1 is a perspective view of an embodiment of an apparatus according to the present invention.

FIG. 1 shows one embodiment of the present invention. The apparatus 1 shown in FIG. 1 includes an input device 2 having multiple positions for communicating a plurality of input signals. The input device 2 can be any device capable of transmitting an input signal. In the embodiment shown, the input device 2 is a rocker-type switch. The rocker switch 2 shown can pivot or rock between two positions in which the rocker switch contacts and activates one of two rubber switches 3 containing conductive pads. The use of rubber switches 3 provides the advantage of allowing the user to still feel a substantial vibration or force through the input device 2 when the user had fully depressed the switch. Suitable rubber switches are available and known in the art. In other embodiments, the input device may include an analog switch, a force sending resistor, a strain gauge based sensor, a capacitative touch switch, a scroll wheel, a mini-joystick, a touchpad, a touch screen, a 3-way switch, a 4-way switch, a 5-way switch, or other input device. Each position of the input device 2 corresponds to one of the input signals.

The input device 2 and rubber switches 3 are mounted on a Printed Circuit Board (PCB) 4 in the embodiment shown to facilitate electrical communication between the input device 2 and an electronic device (not shown). The PCB 4 can be custom shaped according to the device into which the apparatus 1 is placed. The PCB 4 also provides for secure mounting within the device by including, for example, a plurality of holes 5 to accept fasteners for securing to the electronic device. In another embodiment, the input device 2 can be directly connected or mounted in the electronic device.

The apparatus 1 shown in FIG. 1 also includes a vibrotactile actuator 6 in communication with the input device 2. Preferably, the actuator 6 is configured to output a plurality of distinct tactile feedback sensations to the input device 2. Suitable tactile sensations include vibrations, for example, jolts and textures, and a plurality of distinct tactile sensations can be created by varying the frequency, amplitude and waveform output by the actuator 6. The actuator 6 is selected to deliver the desired tactile sensations to the input device 2 The actuator 6 shown in FIG. 1 is a voice coil actuator. Other suitable actuators include, for example, piezo-electric actuators, eccentric mass actuators, moving magnet actuators, and friction brakes in contact with metal shafts. In addition, the actuator can include a flexure, for example an arrangement of flexible material, coupled to the rotating shaft of a DC motor or step motor to transform the rotation of the motor shaft into vibrations or other haptic sensations. Various arrangements of a flexure coupled to a motor may be used as an actuator. For example, U.S. patent application Ser. No. 09/585,741, filed Jun. 2, 2000, illustrates suitable arrangements of flexures and motors for use as an actuator in embodiments of the present invention. The entire disclosure of the application Ser. No. 09/585,741 is incorporated herein by reference. Tactile sensations can also be delivered to the input device 2 from a speaker included with an electronic device into which the apparatus is placed, for example the speaker in a mobile telephone or in a personal computer.

Although the embodiment shown in FIG. 1 includes one input device 2 and one actuator 6, other embodiments include a plurality of input devices, all in communication with a single actuator. Alternatively, an embodiment can include a plurality of actuators each in communication with at least one input device. Various arrangements of actuators in combination with input devices are suitable for use in the present invention. For example, U.S. patent application Ser. No. 09/263,263, filed Jul. 26, 2001, published on Mar. 21, 2002, as U.S. Patent Pub. No. US2002/0033795 illustrates actuators in combination with input devices that may be used in embodiments of the present invention. The entire disclosure of application Ser. No. 09/263,263, Pub. No. 2002/0033795 is incorporated herein by reference.

As mentioned, the actuator 6 is in communication with the input device 2. In the embodiment shown in FIG. 1, the actuator 6 is in communication with the input device 2 through a cantilevered beam or lever arms 7 attached to the pivoting rocker, amplifying the effective forces of the actuator 6 felt by the user. The tactile sensations generated by the actuator 6 propagate through the lever arm 7 to the input device 2. Suitable materials for the lever arm 7 are capable of transmitting the tactile sensations and can be, for example, metal. The lever arm 7 shown includes one or more bends 8 to fit within the electronic device in which the apparatus 1 is disposed. Different shapes of bends may be used to fit within the electronic device. In another embodiment, the actuator 6 is mounted directly to the input device 2 or to any component of the input device. Alternatively, the actuator 6 is mounted to the PCB 4 to which the input device is attached, communicating tactile sensations to the input device through the PCB. In another embodiment, the actuator is an existing eccentric mass motor as is used, for example, as a vibrating ringer in a pager or mobile telephone.

The vibrotactile actuator 6 can also be mounted to a portion of the case or housing of the electronic device in which the apparatus 1 is disposed, communicating the tactile sensations to the entire electronic device. In one embodiment, two actuators can be incorporated in the case or back of an electronic device, for example the case of a mobile phone in an area that contacts the user's hand. This arrangement effectively doubles the amplitude of the tactile sensation, and the user's fingers do not tend to attenuate the tactile sensation.

The apparatus 1 also includes a controller 9 in communication with the input device 2 to receive the input signals therefrom. The controller 9 can also receive additional information from the input device 2 including the position of the input device 2 and the amount of pressure applied to the input device 2. In one embodiment, the input signal includes information related to the amount of pressure applied to the input device 2, information related to the position of the input device 2, or a combination of information about pressure and position. In addition to being in communication with the input device 2, the controller 9 is in communication with the actuator 6 to produce a tactile sensation in the actuator 6 corresponding to the input or input signal received by the controller 9 from the input device 2.

The controller 9 is located in a suitable location according to the needs of the device in which the apparatus 1 is placed. In one embodiment, the controller 9 is attached to the PCB 4 as shown in FIG. 1. Suitable controllers, include, for example, digital logical processors capable of processing input, execute algorithms, and generate output as necessary to created the desired tactile sensations in the input device in response to the inputs received from that input device. Such controllers may include a microprocessor, an Application Specific Integrated Circuit (ASIC), and state machines. Such controllers include, or may be in communication with, media, for example computer readable media, which stores instructions that, when executed by the controller, cause the controller to perform the steps described herein as carried out, or assisted, by a controller. On embodiments of a suitable computer-readable medium includes an electronic, optical, magnetic, or other storage or transmission device capable of providing a processor, such as the processor in a web server, with computer-readable instructions. Other examples of suitable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, including a router, private or public network, or other transmission device or channel.

In one embodiment, the apparatus 1 includes a dedicated controller 9 for use specifically with the apparatus 1. This embodiment is particularly well suited for applications where the apparatus 1 is retrofitted into an existing electrical or electronic device. In another embodiment, the controller 9 is the microprocessor or Central Processing Unit (CPU) of the electronic device in which the apparatus 1 is disposed. The apparatus 1 can also include additional circuitry such as the drive circuitry (not shown) necessary to create the tactile sensations in the actuator 6 in response to input from the controller 9 and a memory medium for storing data to be accessed by the controller 9 for example a correlation between the tactile sensations to be produced in the actuator 6 and the input information or input signal received from the input device 2.

Figure 2:
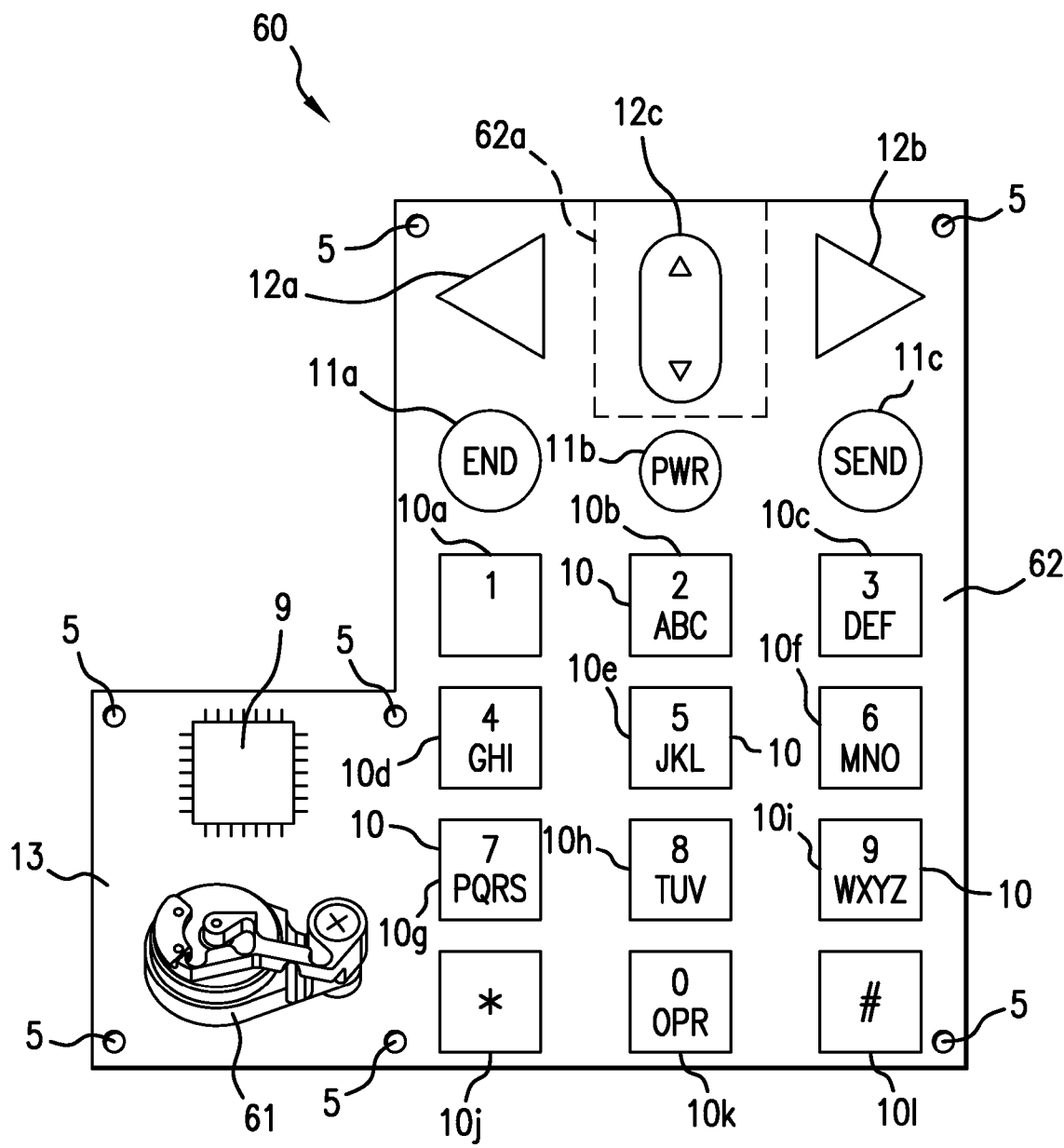
FIG. 2 is a plan view of another embodiment of an apparatus according to the present invention.

FIG. 2 shows another embodiment of the present invention. An apparatus 60 shown in FIG. 2 includes multiple input devices. These multiple input devices include twelve fixed or pre-assigned alphanumeric input buttons 10a-l, three pre-assigned function buttons 11a-c, and three assignable function buttons 12a-c. The plurality of inputs devices are arranged according to the electronic device in which the apparatus 60 is situated. In the embodiment shown, the plurality of input devices are arranged as the keys in a key pad for a telephone or mobile telephone.

Embodiments of the present invention include an input device having a means for determining or sensing pressure. The input device is capable of resolving multiple levels of pressure placed on the input device, and of transmitting a signal associated with the level of pressure placed on the input device. These multiple levels of pressure may be defined by, for example, the physical location of, or distance traveled by, a switch-type input device in the x-plane when pressed by a user (higher/lower), the magnitude of pressure placed on a touchpad-type input device, or other means.

The buttons of FIG. 2 are illustrative of such an embodiment. Each of the alphanumeric input buttons 10 shown in FIG. 2 is a keypad button. Each of the buttons 10 is capable of resolving multiple levels of pressure placed on the buttons 10. For example, the button 10i (corresponding to the number 9 on the keypad) is capable of resolving five levels of pressure placed on the button 10i. In the embodiment shown, the first level is a state in which no pressure is placed on the button by a user, the second level being a first magnitude of pressure placed on the button (greater than no pressure placed by the user), the third level being a second magnitude of pressure placed on the button (where the second magnitude of pressure is different from or greater than the first magnitude), the fourth level being a third magnitude of pressure placed on the button (where the third magnitude is different from or greater than the second magnitude), and the fifth level being a fourth magnitude of pressure placed on the button (where the fourth magnitude is different from or greater than the third).

In button 10i, each of levels two through five is associated with a distinct input signal. When the button 10i is in its first state, then the button 10i does not transmit an input signal. When pressure is applied to the button 10i by a user that exceeds the first magnitude of pressure, the button 10i transmits a first signal to the controller 9. When greater pressure is applied to the button 10i that exceeds the second magnitude of pressure, the button 10i transmits a second signal to the controller. When still greater pressure is applied to the button 10i that exceeds the third magnitude of pressure, the button 10i transmits a third signal to the controller. When even greater pressure is applied to the button 10i that exceeds the fourth magnitude of pressure, the button 10i transmits a fourth signal to the controller. The structural arrangement of the communication by the button 10i to the controller 6 of an input signal is further illustrated in FIG. 4, described below.

Each of the levels two through five of button 10i (and thus each of their associated signals) is associated with a letter, W-Z. The second level is associated with the letter W, the third level is associated with the letter X, and so on. The second level is associated with the letter W, the third level is associated with the letter X, and so on. In the embodiment shown, the key 10i has five positions corresponding to no pressure, and the letters W, X, Y, and Z. In an alternative embodiment, the key 10i has six positions corresponding to no pressure, the number "9," and the letters W, X, Y, and Z.

In the embodiment shown, the alphanumeric buttons 10 are all capable of resolving five levels of pressure. In alternative embodiments, the various buttons are capable of resolving differing levels of pressure. For example, in an alternative embodiment, while the button 10i is capable of resolving five levels of pressure, the button 10b (corresponding to the number 2 on the keypad) is capable of resolving four levels of pressure placed on the button 10b (the first level being no pressure placed on the button). Like button 10i, the levels resolved by button 10b in the alternative embodiment are each associated with a distinct input signal, and are each associated with a distinct letter of the alphabet, A-C.

The pre-assigned function buttons 11a-c of the apparatus 1 are keypad push buttons. Each of the buttons 11a-c is capable of resolving three levels of pressure placed on the buttons 11a-c no pressure, a first magnitude of pressure (greater than none), and a second magnitude of pressure (greater than the first magnitude). Examples of functions carried out by such pre-assigned function buttons 11a-c include "Send" 11a, "Power" 11b, and "End Call" 11c.

In the embodiment shown, each of the pre-assigned function buttons 11a-c is configured such that the first magnitude of pressure is an amount of pressure that signifies that a user's finger is "hovering" over, or touching with more than passing force, the button. Each is also configured such that the second magnitude of pressure is an amount of pressure that signifies that a user's finger applies when the user wishes to activate the button.

Thus, in the embodiment shown, when a user's finger "hovers" over the "Send" button 11c, a first signal is transmitted by the button 11c to the controller. And, when a user's finger activates the "Send" button 11c, a second signal is transmitted by the button 11c to the controller.

The assignable-function buttons 12a, 12b, 12c are buttons whose function depends upon the mode of operation of the device with which the apparatus 1 is associated. For example, when such an apparatus 1 is associated with a mobile telephone, such buttons 12a, 12b, 12c may be used to navigate the menus displayed to carry out various functions, such as scrolling through an address book, selecting a number to dial, editing a number, re-setting the time displayed, and similar functions.

In addition, the assignable-function buttons 12a-c are configured similarly to the pre-assigned buttons 11a, 11b, 11c, in that the buttons 12a, 12b are configured such that the first magnitude of pressure is an amount of pressure that signifies that a user's finger is "hovering" over, or touching with more than passing force, the button, and such that the second magnitude of pressure is an amount of pressure that signifies that a user's finger applies when the user wishes to activate the button. Preferably, the buttons 11a, 11b, 11c, 12a, 12b, 12c are configured such that they receive and analyze other data in determining whether the user is merely hovering or, instead, wishes to activate the button (such as type of, and duration of, contact with the button). Any suitable input-device may be used an assignable-function input device. Examples of such input-devices include rocker-switches and scroll wheels.

In an alternative embodiment (not shown), the middle assignable-function button 12c, includes the input device of FIG. 1. It is in communication with the actuator 6 (not shown) shown in FIG. 1 as well, and operates in the manner described with reference to FIG. 1. In such an embodiment, the PCB 62 is separated at line 62a, such that the PCB4 of FIG. 1 is not in contact with PCB62.

Referring again to FIG. 2, although in the embodiment shown there the alphanumeric keys have four or five available states (embodying an alphanumeric-character selection), and the pre-assigned buttons 11a, 11b, 11c, and the assignable-function buttons 12a, 12b, 12c are configured to indicate hover/activation signals, in other embodiments, other configurations may be used. Moreover, although the alphanumeric keys 10 have four or five available states, thus allowing them to be associated with three or four (or more) input signals, such keys 10 may be configured to provide input signals at, for example, only two of the states. In this way, such keys 10 may be configured to provide hover/activation signals similar to that which is provided in the pre-assigned buttons 11a, 11b, 11c, and assignable-function buttons 12a, 12b, 12c in the embodiment shown in FIG. 2.

Moreover, in the embodiment shown, the levels for the alphanumeric input devices 10 correspond to magnitudes of pressure, but in other embodiments the levels resolved can be type of touch, magnitude, physical position of the switch and other attributes of contact with the button, or some combination thereof. The input signals provided by such input devices may be configured accordingly.

In the embodiment shown in FIG. 1, the input signals that are transmitted by the input devices are transmitted to a controller 9. In the embodiment shown, the controller is in communication with storage memory (not shown). Examples of such memory includes Read Only Memory (ROM). The storage memory includes a table in which input signals are associated with various haptic feedback signals. This is explained more fully in relation to FIGS. 9-10.

Figure 4:
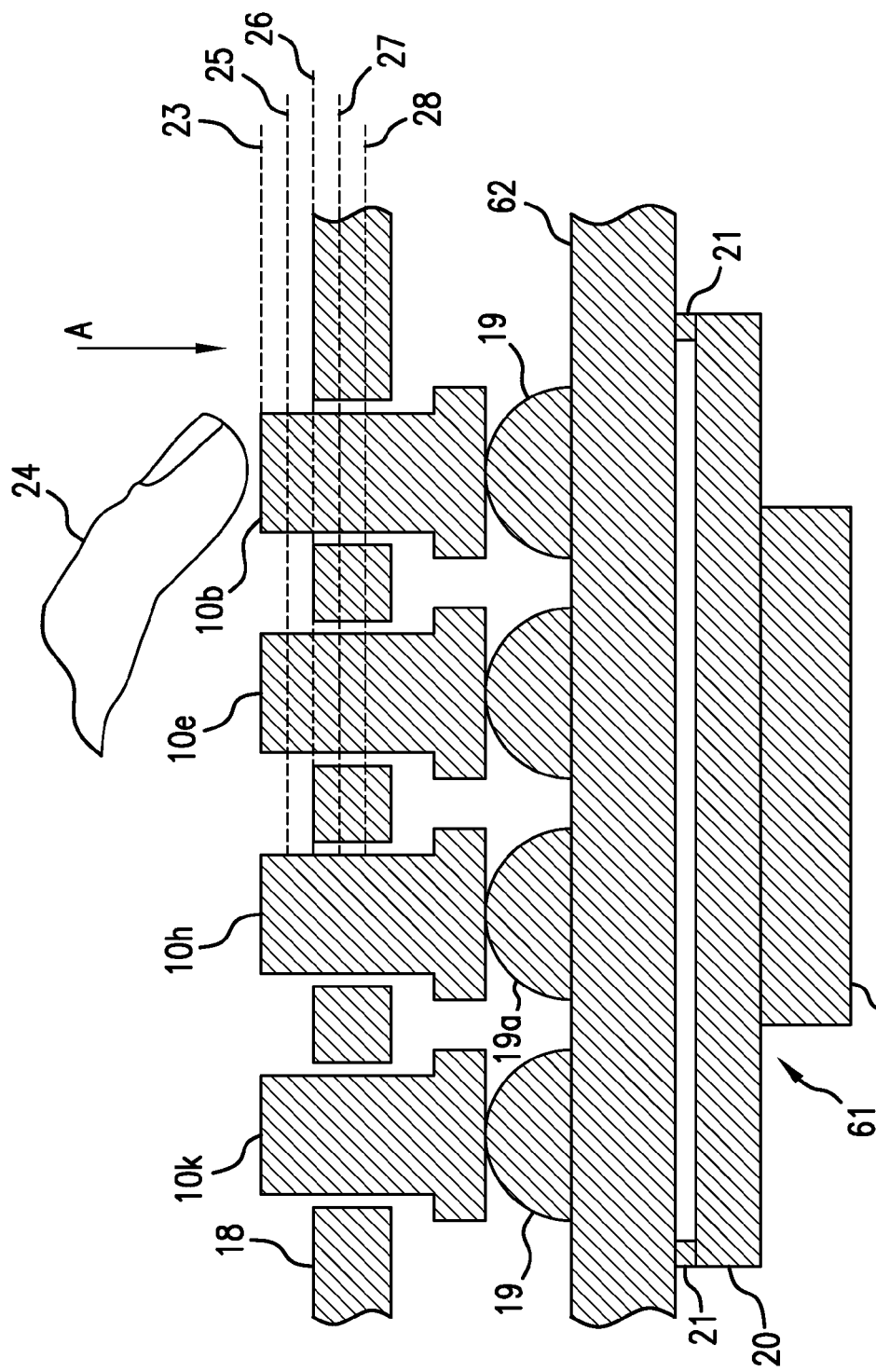
FIG. 4 is a schematic representations through line 4-4 of FIG. 3.

The apparatus 1 shown in FIG. 2 also includes an actuator 61. The actuator 61 is shown in representative fashion in FIG. 2, and not to scale or in physical placement. An alternate actuator 61 and physical placement of the actuator 61 is shown in FIG. 4. The actuator 61 is in communication with the various input devices, and is configured to provide vibrations of varying frequencies, magnitudes, and wave-forms to the input devices. The actuator 61 is also in communication with the controller 9. Further description of embodiments of such communication and configuration is provided below.

In the embodiment shown, the controller 9 receives an input signal from one of the input devices. The controller 9 then analyzes the input signal received to determine a signal to transmit to the actuator 61.

For example, the controller 9 of FIG. 2 is configured such that when the controller 9 receives a signal associated with the second level from button 10i (the "9" key), the controller 9 sends a first control output signal to the actuator, and when the controller receives a signal associated with the third level from the button 10i, the controller sends a second control output signal to the actuator 61, and so on. The first control output signal is one that causes the actuator to provide a vibration of a certain, first frequency. The second control output signal is one that causes the actuator to provide a vibration of a certain, higher frequency, and so on. In other embodiments, the vibrations provided may be of the same frequency.

Figure 3:
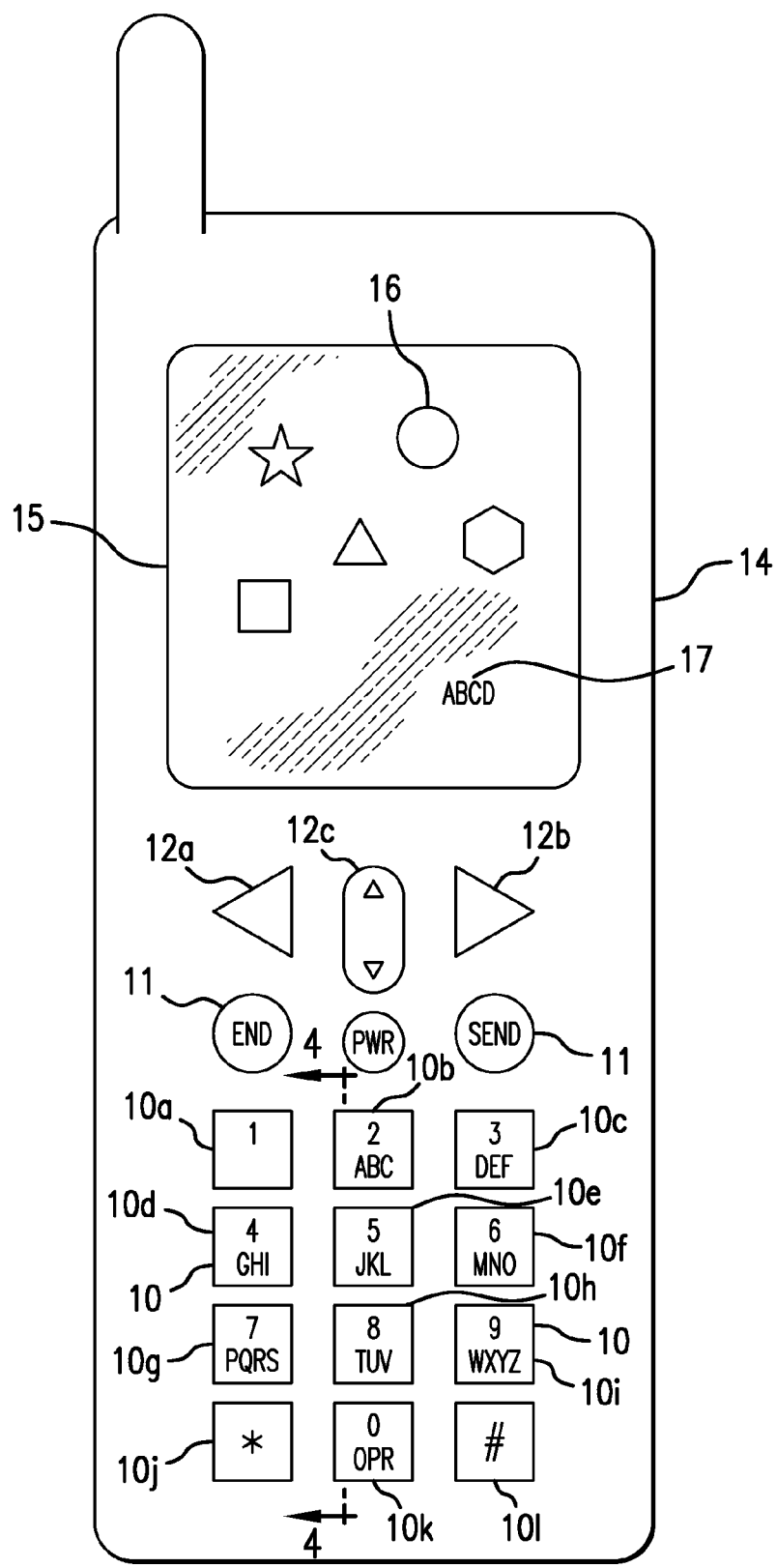
FIG. 3 is a plan view of an electronic device including an embodiment of the present invention.

FIG. 3 shows another embodiment of the present invention, in the form of a mobile telephone 14 having the apparatus of FIG. 2. The controller 9, actuator 61, and the PCB 62 of the apparatus 60 of FIG. 2 are encased in a case 18 of the mobile telephone 14. The mobile telephone 14 also includes a display screen 15 capable of displaying graphic objects 16 and alpha-numeric information 17. The alpha-numeric information 17 that may be displayed includes phone numbers and lists, for example of list of entries in a phone book, that are input by the alpha-numeric input buttons 10 and accessed by the assignable function buttons 12a-12c.

FIG. 4 is a schematic representation through line 4-4 of FIG. 3 illustrating that the alpha-numeric input buttons or keys 10 in the mobile telephone pass through the case 18 of the mobile telephone and contact a plurality of switches 19 disposed on the PCB 62. The switches 19 are in communication with the controller 9 (not shown). Suitable switches 19 include any analog or digital switch, for example rubber switches, snap dome-type switches, and pressure sensitive switches. Preferably, the switches 19 are capable of producing distinct input signals to the controller. Even more preferably, the switches 19 are capable of producing such signals for two or more positions. In the embodiment shown, the keys 10 contact a plurality of digital switches, each capable of producing four distinct input signals to the controller 9 to correspond to the four levels at which pressure is applied to the buttons 10 by the user.

The PCB 62, on a side opposite the switches, is in communication with the actuator 61. As illustrated, the actuator 61 is a piezo-electric actuator having a metal diaphragm 20 in contact with the PCB 62 through one or more spacers 21 and a piezo ceramic element 22 in contact with the metal diaphragm 20. Alternative actuator embodiments include a flexure coupled to the shaft of a motor, secured to the PCB 62.

As illustrated, the keys 10 are initially in a rest position 23. A biasing member arrangement (not shown) as is available and understood in the art is used to hold the keys in the rest position 23. An object 24, for example the user's finger or a stylus, is used to select one or more of the keys 10 by applying pressure in the direction of arrow A. This pressure causes the selected key to progress through a plurality of positions. As illustrated, after leaving the rest position 23, the keys pass sequentially through a second position 25, a third position, 26, a fourth position 27, and a fifth position, 28 as greater and greater pressure is applied to the button 10. The distance of travel between each position does not have to be equal, and the amount of pressure required to move between each position can vary. In addition, for a given key, the number of positions can vary from two (no pressure and activated) up to the number of input signals assigned to a given key. Therefore, in the embodiment shown, a key 10$i$ is moveable from a first level (rest) 23 to a second level 25 upon the application of a sufficient amount of pressure to the input device. In the embodiment shown in FIG. 3, the amount of pressure necessary to move the key 10$i$ from rest 23 to the second position 25 is about equal to the amount of pressure that user's finger would exert upon contact with the key without actually selecting the key.

Accordingly, in one method of using the embodiment shown in FIG. 3, when a user of the mobile telephone 14 shown in FIG. 3 presses the "9" key 10$i$ using a relatively light amount of pressure, the button 10$i$ moves from rest state 23 to its second level 25. Such movement causes the button 10$i$ to apply pressure to switch 19$a$, which is received by switch 19$a$. The switch 19$a$ is in communication with the controller 9. The switch 19$a$ is configured to transmit a first signal to the controller 9 upon receiving a pressure of magnitude indicating that sufficient pressure has been placed on button 10$i$ to move from its first level 23 to its second level 25. The controller 9 receives this first signal. The controller 9 is configured to transmit a first controller output signal to the actuator 61 upon receipt of this first signal from the switch 19$a$. The controller transmits the first controller output signal to the actuator 61. The actuator 61 is configured to provide a vibration of a first pre-selected frequency to the metal diaphragm 20 of a pre-selected duration upon receipt of such a first signal. In the embodiment shown, the actuator 61 provides a side-to-side vibration to the diaphragm. The diaphragm 20 thus vibrates at the pre-selected frequency, in turn causing the PCB 62 to vibrate at that same frequency, and thus in turn causing the switches 19 to vibrate at that frequency. The switch 19$a$ is in communication with the button 10$i$, thus causing the button 10$i$ to vibrate at that frequency.

When the user applies further pressure to the button 10$i$ sufficient to cause the button to move from the second level 25 to a third level 26, the button's force is applied to switch 19$a$. Switch 19$a$ receives the force and is configured to transmit a second signal to the controller 9 whenever it receives force to indicate that the button 10$i$ has moved from the second level 25 to the third level 26. The switch 19$a$ does so, and the controller 9 receives the second signal. The controller 9 is configured to transmit a second controller output signal to the actuator 61 upon receipt of this second signal from the switch 19$a$. The controller 61 transmits the second controller output signal to the actuator 61. The actuator 6 is configured to provide a vibration of a second pre-selected frequency, different from the first pre-selected frequency, for a pre-determined duration to the metal diaphragm 20 upon receipt of such a second signal. In other embodiments, the first and second pre-selected frequencies are the same. As above, the actuator 61 provides a side-to-side vibration to the diaphragm, which is communicated through the PCB 62 and switches 19 to the button 10$i$.

When a user applies pressure to the button 10$i$, which is communicated to the switch 19$a$, at each level 25, 26, 27, 28, a distinct signal is transmitted by the switch 19$a$ to the controller 9. Thus, in the embodiment shown, different signals are transmitted by the switch 19$a$ for each pressure-applied levels 25, 26, 27, 28.

In the embodiment shown, a "dwell to select" function is employed. For example, when a user provides sufficient input to cause the button to move to its second level 25, the first signal is transmitted to the controller 6 continuously while the button receives pressure to push it at or past the second level 25 but not sufficient pressure to push the button 10$i$ to the third level 26. The controller 9 determines the length of time the button is maintained at the second level 25 by monitoring the length of time the first signal is transmitted to the controller 9. If the first signal is received for greater than a pre-determined length of time, the controller determines that the user wishes to "select" the function associated with the second level 25 by the fact that the user "dwelled" at that level for the pre-determined time. Upon so determining, the controller 9 transmits a signal to a processor (not shown) indicating that the user has selected the function associated with the second level of button 10$i$, in this case the selection of the letter "W." In embodiments, the controller 9, upon so determining, also transmits a signal to the actuator 61 to cause the actuator 61 to vibrate at a frequency, magnitude, and/or wave-form indicative of selection of the function.

In one embodiment, in addition to providing haptic feedback to the input device, the controller 9 also sends a signal to the display 17 to cause the alphanumeric character associated with the input signal to be displayed. For example, in one embodiment, upon detecting the presence of a first pressure (through receipt of a first input signal) and sufficient dwell time to indicate a selection, the controller sends a signal to the display 17 indicating that the display should display the letter "X." Upon detecting the presence of a second pressure (through receipt of a second input signal) and sufficient dwell time to indicate a selection, the controller sends a signal to the display 17 indicating that the display should display the letter "Y." Upon detecting the presence of a third pressure (through receipt of a third input signal) and sufficient dwell time to indicate a selection, the controller sends a signal to the display 17 indicating that the display should display the letter "Z." The display 17 then displays each of these characters, X, Y, Z.

Various other embodiments may be employed. For example, instead of having a single actuator to provide feedback to all input devices receiving such feedback, like the embodiments shown in FIGS. 2-3, other embodiments have two or more actuators. These two or more actuators may be in communication with all or part of the input devices that provide tactile feedback. The two actuators may each provide significantly different types of feedback to the same set of input devices, or each may be in communication with a different group of input devices to provide the same or different types of feedback. As another example, the actuator and input devices may be configured to provide vibration to only the button that is receiving pressure from the user, or they may be configured to provide vibration to all buttons or at least more buttons than the one(s) receiving pressure from the user.

Moreover, although the actuator 61 is shown as disposed below the PCB 62 in FIG. 4, in other embodiments the actuator 61 may be disposed at other locations within the device having such apparatus, whether the device is a mobile telephone, PDA, or other device. Preferably, the actuator is disposed within the housing of the device. Preferably, it is communication with the PCB 62, but is placed anywhere in communication with the PCB 62 as the size and space restrictions of the application will allow. In other embodiments, the actuator 61 is located outside the housing of the device (such as beside it). In still other embodiments, the actuator 61 is in communication with the input devices other than through the PCB 62.

In the embodiment shown, a distinct tactile sensation is produced for each of the various levels at each of the various keys. In other embodiments, the controller 6 selects one of a pre-selected group of sensations to provide in response to the various signals received by the controller.

Figure 5:
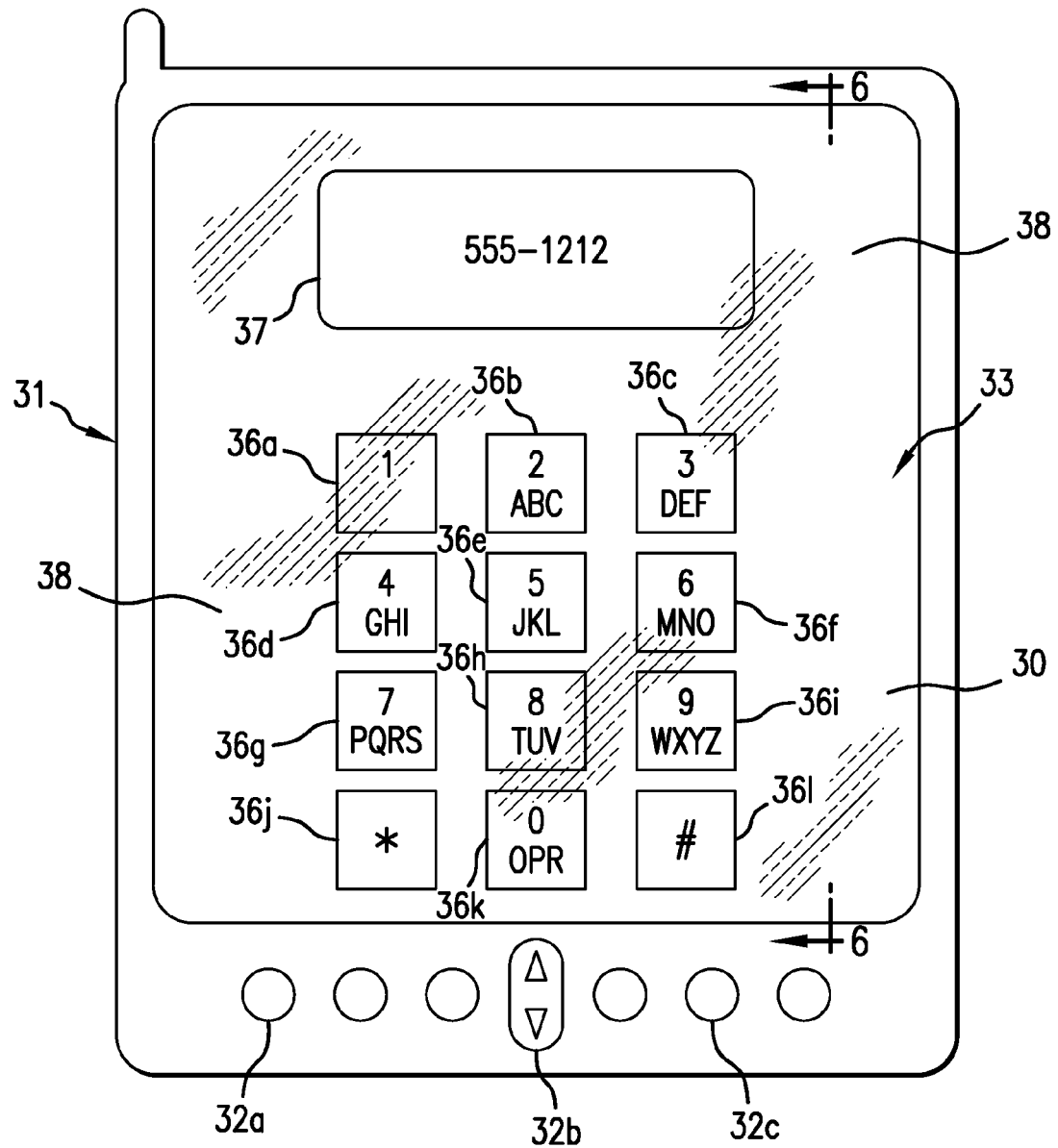
FIG. 5 is a plan view of another electronic device including another embodiment of the present invention.

FIG. 5 shows another embodiment of the present invention. Referring to FIG. 5, a PDA 31 having an input device in the form of a pressure-sensitive touchpad 30 is shown. The PDA 31 also includes a plurality of mechanical type buttons 32. The PDA 31 also includes a display panel 33 capable of displaying computer generated graphics. Suitable display panels include flat-panel type displays including a Liquid Crystal Display (LCD), plasma displays, Thin Film Transistor (TFT) type displays or other flat displays, such as are found in laptops and color PDA's, and conventional cathode ray tube displays.

Figure 6:
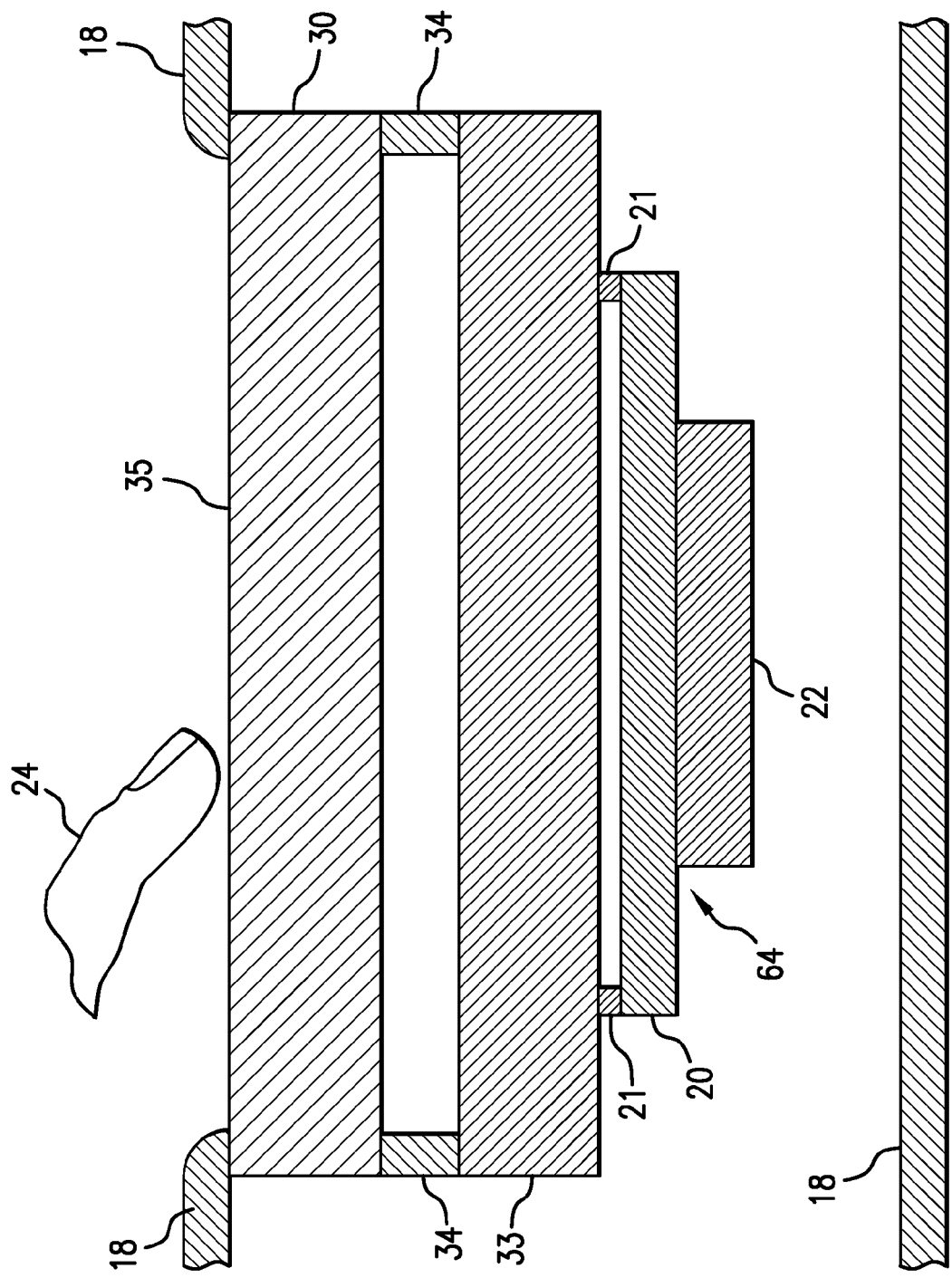
FIG. 6 is a schematic representations through line 6-6 of FIG. 5.

FIG. 6 shows a cross-sectional view of the PDA 31 of FIG. 5 along line 6-6. As is best displayed in FIG. 6, the display 33 is underneath the touchpad 30 and is in communication with the touchpad 30 to transmit tactile sensations thereto. The display 33 is also in communication with an actuator 64 to receive a tactile sensation therefrom for communication to the touchpad 30. Other arrangements of the touchpad 30, display 33 and actuator 64 are also possible including arrangements in which the actuator 64 is in direct contact with the touchpad 30. The display 33 is in communication with the touchpad 30 through two spacers 34. Suitable spacers are constructed of a material that can transmit the tactile sensations between the display 33 and the touchpad 30. In other embodiments, the touchpad 30 and display 33 are in direct physical contact, and the touchpad 30 and display are not in communication. The tactile sensations produced in the touchpad 30 are transmitted to the object 24 when the object 24 is brought into contact with a surface 35 of the touchpad 30.

Referring again to FIG. 5, the display 33 displays a plurality of software-generated buttons or keys, called softkeys 36a-i. The softkeys 36a-i provide a graphical user interface for the PDA 31 and are arranged in a desired pattern or grid. Each softkey 36 occupies a distinct location on the display panel. As illustrated, the PDA 31 can function as a mobile telephone, and the softkeys 36 are arranged as a telephone keypad to provide the same functionality as the mechanical keys on a conventional telephone keypad. The display 33 of the PDA 31 also includes additional graphical outputs 37 and areas 38 without graphical output. The displayed softkeys 36 are viewable through the touchpad 30 and represent corresponding unique positions on the touchpad 30.

An object 24, for example a human finger, selects a desired softkey 36a-i by contacting the touchpad 30 at the appropriate location. A controller (not shown) is in communication with the touchpad 30. The controller of this embodiment is similar in structure and functionality to the controller described in relation to the embodiment of FIG. 3. The controller is capable of determining the location on the display screen 33 that is touched by the object 24, and the softkey 36 corresponding to the touched location. Based upon this information, the controller causes the actuator 64 to provide a corresponding tactile sensation. The actuator 64 can cause vibrations in the touchpad 35 in a direction parallel to the surface 35 of the touch paid or perpendicular to the surface 35 of the touchpad 30. The controller also determines when an input is ambiguous, such as when two or more softkeys are simultaneously selected or when an area of the display containing no graphics 38 is touched, and causes the actuator to output an appropriate tactile sensation. Preferably, the same controller that controls the displayed softkeys 36 also controls the tactile feedback sensations produced by the actuator 64.

Certain softkeys 36b-i represent multiple positions or multiple inputs, each input or position corresponding to a distinct amount of pressure applied to the softkey 36b-i. This distinct amount of pressure is detected by the controller in communication with the touchpad 30. Alternatively, the apparatus can include a separate pressure calculator to measure the amount of pressure applied to the touchpad 30. In the embodiment shown, the amount of pressure applied to the touchpad 30 is calculated by the controller based upon the amount of area of the object 24 used to select the softkey that is in contact with the surface 35 of the touchpad 30.

The amount of pressure applied to the input device or to the softkey 36a-i on the touchpad can be determined by reading or determining the size or area of the contact patch created by the object 24, such as the user's finger, on the input device or softkey 36a-i. In addition to reading the current size of the contact patch, the rate of change of the contact patch can also be determined, using dynamic thresholds and to look at how fast the user's pressure is changing. If the contact patch area changes at a sufficiently large rate, the controller can determine that the corresponding input device or softkey 36a-i is being selected.

The functionality of the softkeys shown in FIG. 5 is similar to the mechanical key counter parts described in relation to FIGS. 2 and 3. Therefore, the pressure level of a selected softkey may be moveable from a first position to a second position upon the application of a sufficient amount of pressure. The amount of pressure necessary to move the softkey 36a to the second position (the first position being at rest or no contact) input device to the first position is about equal to the amount of pressure that user's finger would exert upon contact with the touchpad surface and sliding lightly along the surface. In this embodiment, the controller is configured to cause the actuator to produce a first tactile sensation when the softkey 36a is in the second position or when the applied pressure is less than the amount of pressure necessary to indicate that the softkey has been selected, that is the third position. The controller would then cause the actuator 64 to produce a second tactile sensation upon receipt of the input signal associated with the third position or upon detection of a sufficient amount of pressure applied to the softkey 36a. The softkey 36i has five positions associated with four distinct applied pressures and no pressure at the softkey 36i, and corresponding to the input signals for the letters W, X, Y, and Z. A dwell to select feature can be used to determine the desired position and associated input signal.

This functionality facilitates a user moving an object over the various softkeys displayed on the input device and receiving a specific frequency or tactile sensation to signal that a particular softkey has been touched. As the object 24 contacts other softkeys in the display matrix, additional distinct tactile sensations unique to these other softkeys are produced. With continued use, the user can quickly become accustomed to the various distinct tactile sensations and the associations between sensations and specific softkeys, permitting identification and selection of softkeys or buttons by touch alone. In fact, distinct tactile sensations can be used with the same button regardless of the electronic device, creating a universal tactile sensation library similar to for example, a busy signal providing a universal auditory signal that a telephone number is unavailable regardless of the type of telephone equipment used. For example, a distinct tactile sensation can be played when the object is in contact with the "5" key, providing a "home" key indication. In addition, keys located on the center axis can have a single "pop" while keys in the columns to the left and right of the center axis have two "pops", providing an indication of the general location of the object 24 in a keypad matrix.

In another example, if the user is moving the object 24 over the "9" key, a relatively high frequency vibration can be output on all the keys. When the pressure associated with the object is detected at the "6" key, a lower frequency vibration can be output, allowing the user to determine which key is presently in contact with the object through the sense of touch. Since it is unlikely that a user would press or contact more than one softkey simultaneously, a single vibrotactile actuator outputting the same sensation to all of the buttons simultaneously can be used. When the user applies increased pressure to a softkey with the object 24 and that pressure is greater than a predetermined threshold pressure level, the function associated with that softkey is activated.

Figure 7:
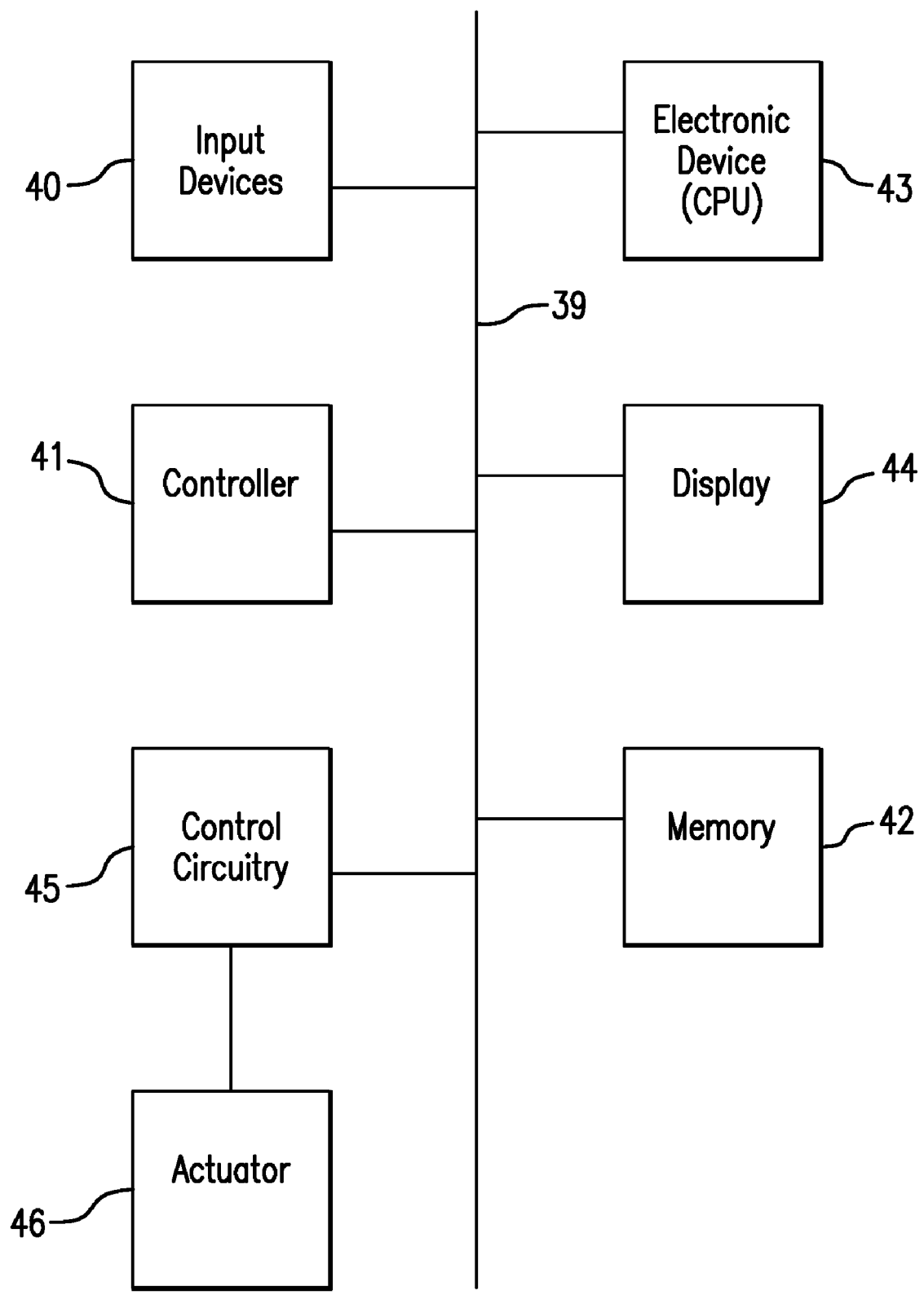
FIG. 7 is a block diagram illustrating an embodiment of the apparatus in an electronic device.

FIG. 7 is a block level diagram illustrating a representative embodiment of the present invention. The various components communicate across a common communication bus 39. The input devices 40 produce input signals in accordance with the present invention, and the input signals are communicated to the controller 41 across the communication bus 39. The controller 41 can also receive pressure or position information regarding the input devices associated with the received input signal. Based upon the received input signal, pressure and position data, the controller accesses a memory 42 to obtain the necessary data regarding the functionality and tactile feedback associated with the received input signal. In addition, the controller 41 can update data stored in the memory as for example when the input signal relates to changing the functionality or input options associated with the input device that produced the input signal. Based upon the received functionality, the controller delivers a function signal to the electronic device 43 to which the apparatus is connected. In addition, the controller 41 modifies the output on the display 44 in particular where the display is part of the input device, such as when a touchpad is used. Alternatively, the electronic device controls and updates the display. In addition, the controller can be the CPU associated with the electronic device, and the memory can be the memory associated with the electronic device. The arrangement of the controller, memory and display depends upon whether or not the apparatus is constructed as a standalone device that can be retrofitted into an existing electronic device or is incorporated into the electronic device itself. The controller uses the tactile feedback information received from the memory to provide the necessary input to control circuitry 45 to drive the actuator 46 to produce the desired tactile sensation in the appropriate input device.

Figure 8:
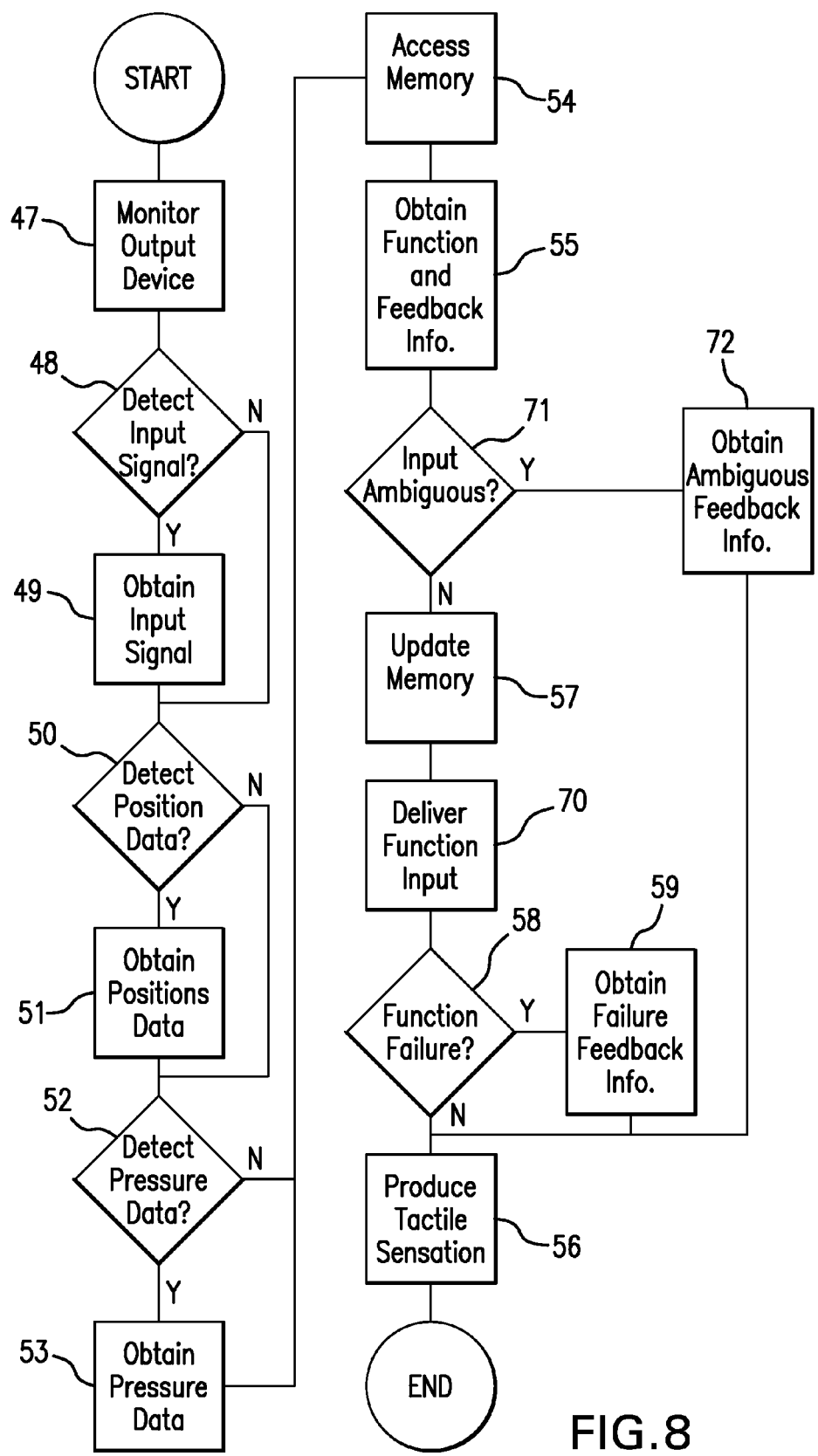
FIG. 8 is a flow chart illustrating a method according to the present invention.

Referring to FIG. 8, a flow chart illustrating a method of producing a tactile feedback sensation in an input device according to the present invention is illustrated. A controller monitors an input device in an apparatus 47. When a plurality of input devices are included in the apparatus, the controller can either monitor each input device sequentially or in parallel. Although illustrated as a single pass function, monitoring of the input devices is preferably handled as a continuous loop function.

The input device, in response to user input, provides one or more input signals, position data, and pressure data to the controller. As the controller monitors the input device, it first detects whether or not an input signal is being generated by the input device 48. If an input signal is being generated, the controller obtains the input signal 49 associated with the input device. The controller then detects if the same input device is generating any position data 50. If position data is being generated, the controller obtains the position data 51 associated with the input device. The controller also detects if the same input device is generating any pressure data 52. If pressure data is being generated, the controller obtains the pressure data 53 associated with the input device. The controller may detect and obtain the three types of data in any order. Preferably, the controller, while obtaining the data, maintains an association among the input device, the input signal, the pressure data, and the positions data. In some embodiments, the input signal includes pressure data, or data from which the pressure applied to the input device may be calculated, position data, or a combination or pressure and position data.

Having obtained the input data from the input device, or from a plurality of input devices, the controller then accesses a memory device 54 in which is stored at least one database containing information necessary to produce the desired function in the electronic device and the predetermined tactile sensation in an input device, and accesses this information 55. In one embodiment, this information is in the form of associations among the detected input data, the functions of the electronic device or apparatus, and the tactile sensations. An exemplars group of associations is represented in tabular form in FIG. 9.

As is shown in the table, for any given input device, a plurality of combinations of input signals, position data, and pressure data is possible, and each combination relates to a specified function of either the electronic device or a distinct tactile sensation. These combinations vary depending on the type of input device assigned to each input signal and the current functionality of that input device. The controller, using the data obtained from monitoring the input device, reads the table and obtains the associated function and tactile feedback information.

Referring to FIG. 9, in one embodiment, a controller monitors input device number 5. On subsequent monitoring passes, the controller does not detect either an input signal or position data, but detects a distinct pressure, Pressure 1. Based upon the information in the table associated with Pressure 1, the controller obtains the associated function information for selecting the number "2", and information for distinct tactile Sensation 13. The controller delivers the function information to the electronic device 70 which uses that information to display the number "2" or to indicate that the number "2" has been selected. The controller uses the information for distinct tactile Sensation 13 to produce Sensation 13 in an input device 56, by for example, causing an actuator to cause the input device to vibrate at a frequency associated with Sensation 13.

On a later monitoring pass, the controller detects a pressure magnitude of pressure 3 on input device number 5. Similarly, based upon the information in the table associated with Pressure 3, the controller obtains the associated function information for selecting the letter "B" and information for distinct tactile Sensation 15. The controller delivers the function information to the electronic device which uses that information to display the letter "B" or to enter the letter "B" in a program such as a telephone keypad. Therefore, in response to the detection of at least two distinct pressures applied to the input devices, the controller has produced at least two distinct tactile sensations in the input device number 5. The controller can also detect a plurality of distinct pressures applied to input device number 5 and can produce a plurality of distinct tactile sensations in input device 5, each tactile sensation related to one of the plurality of distinct pressures. Although illustrated for a single input device, the controller can detect two distinct pressures for a plurality of input devices and can produce at least two distinct tactile sensations in each one of these input devices. In another embodiment, the controller can detect a plurality of distinct pressures in the plurality of input devices and produce a plurality of distinct tactile sensations in the plurality of input devices. The distinct pressures can represent either discrete pressures or a range of applied pressure.

In another embodiment, the controller monitors input device number 3, which is capable of inputting a plurality of input signals, Inputs 2A-E, to the apparatus. Each input signal corresponds to a distinct pressure applied to input device number 3, Pressures 1-5. Each input signal and pressure corresponds to a distinct function and a distinct tactile sensation, Sensations 5-9. In one embodiment, each input signal corresponds to an alphanumeric character. In this embodiment, the controller delivers function information to the electronic device related to displaying the proper alphanumeric character on an output device associated with the electronic device. Alternatively, the controller can display the associated alphanumeric character directly on the output device.

Referring still to FIG. 9, in another embodiment of a method according to the present invention, the controller monitors input device number 1 and detects a first pressure being applied on a first location on input device number 1. Preferably, input device number 1 is a touchpad input device. In one embodiment, the first pressure is a discrete pressure, pressure 1. In another embodiment, the first pressure represents a range of pressures having a value less than Pressure 1. The function associated with the first applied pressure indicates that this is the pressure range associated with a user simply searching or feeling for the location of the desired button or key. Therefore, the controller does not provide a function input to the electronic device. The controller does, however, provide a first tactile sensation, Sensation 1, to input device number 1.

The controller then detects an input signal, Input 1 and a pressure greater than or equal to Pressure 1 at Input 1. In response, the controller delivers a function input corresponding to "Select" to the electronic device and produces a second distinct tactile sensation, Sensation 2, in Input Device 1.

In another embodiment, the controller monitors Input Device 7 and detects a first pressure, Pressure 1, at a first location, Location 1 on the input device. Preferably, the input device is a touchpad input device. In response, the controller provides a first tactile sensation, Sensation 20, in Input Device 7. In addition, the controller detects a second pressure, Pressure 2, applied at a second location, Location 2, on Input Device 7. In response, the controller provides a second tactile sensation, Sensation 21 in Input Device 7. The first pressure can correspond to a first input signal, Input 7, and a first function, Function 1, and the second pressure can correspond to a second input signal, Input 8, and a second function, Function 2. The controller delivers the associated function input to the electronic device in response to each received pressure. Note that the controller may cause the actuator to include a different wave form, frequency, and/or magnitude as tactile feedback in relation to different pressures, modes, menus, and other functionality.

The controller can also determine if any an ambiguous input is received 71. The ambiguous input can represent a combination of input device, input signal, position data, and pressure data that is not represented the data contained in memory. Alternatively, an ambiguous input signal can represent input simultaneously from two input devices or an input from a portion of a touchpad that is not associated with an input device. In response to receiving an ambiguous input signal, the controller obtains the associated ambiguous tactile feedback information 72 and produces the associated distinct tactile sensation, Sensation 22, in one or more input devices associated with the ambiguous input. In one embodiment, when the controller detects both a first and second input, the controller determines if either one of the inputs is ambiguous. If not, then the controller produces the associated first and second tactile sensations. If either input signal is ambiguous, then the controller produces the ambiguous output tactile sensation 56 in the appropriate input device.

Since the function corresponding to the input signals, positions, and pressures detected by the controller may involve modification of the functions associated with a given combination, the controller can also update the database stored in memory 57. In one embodiment, the controller is monitoring Input Device 6, and detects a first pressure, Pressure 1, applied to that input device. The first pressure corresponds to one of a plurality of input signals, Input 4, corresponding to a first set of input functions, Functions 1-3. The controller obtains Function 1 and Sensation 17 information and produces the appropriate tactile sensation at Input Device 6. Function 1 can represent one set of menus from a list of menus or one operating mode out of a plurality of operating modes. Suitable operating modes include instant messaging, electronic mail, voice mail, games, and missed phone calls.

Since Function 1 represents a menu or mode that may have additional sub-menus or mode functions associated with it, the controller, in response to Function 1 updates the database as illustrated in FIG. 10. As the controller continues to monitor Input Device 6, it detects a second pressure 3" corresponding to one of the input signals, Input 6, which corresponds to one function in the second set of functions, Function 6. The controller also obtains the tactile sensation, Sensation 19", associated with the selected second set function and provides this tactile sensation at Input Device 6. In addition, the controller provides an associated function signal to the electronic device. Suitable second set functions include sub-menus and functions corresponding to the selected first set function. In addition, the second set functions can include a function that returns the set of functions to the first set of functions. Although the pressures and tactile sensations associated with the first and second set of functions can be the same, preferably, the first pressures and tactile sensations, Pressures 1-3 and Sensations 17-19, are distinct from the second pressures and tactile sensations, Pressures 1"-3" and Sensations 17"-19".

In an embodiment of the apparatus of the present invention, for example, the apparatus is incorporated into a mobile phone and includes an assignable-function input device and assignable function rocker switch input device. In a main or home screen of the mobile telephone that is displayed upon powering up the mobile telephone, the assigned function for the assignable-function input device is "PHONEBOOK" and the rocker switch has no current function assigned to it. Light searching pressure applied to the assignable input device and the rocker switch will produce first and second distinct tactile sensations to indicate which input device is being contacted. Selecting the rocker switch will not produce any function in the mobile phone since no function is currently assigned and a function failure tactile sensation, as described herein, will be output through the rocker switch. Selecting the assignable input device will place the mobile telephone in "Phonebook" mode and a third distinct tactile sensation will be output through the assignable input device.

A list of phonebook entries is now displayed on the screen of the mobile telephone. The assignable input device is assigned the function "SELECT" and the rocker switch is assigned a scroll function. Light pressure on the assignable input device or the rocker switch produce a fourth and fifth distinct tactile sensations, indicating that the mobile phone and the input devices are in "Phonebook" mode. Selecting the rocker switch to either scroll up and down produces bumps or clicks associated with scrolling a list of entries in the rocker switch. Special clicks can be output for passing each alphabetical tab in the phonebook or for passing frequently called entries. In one embodiment, an analog switch is included under the rocker switch to provide an analog signal roughly in proportion to the pressure registered on the rocker switch. This allows the list that is being scrolled to be scrolled at a rate that can be controllable with the amount of pressure applied, and which is communicated to the user by corresponding increase in the rate of haptic events played on the rocker switch. Once the rocker switch has been used to highlight the desired entry, the assignable input device is pushed to select that entry and a sixth distinct tactile sensation is output through the assignable input device.

The assignable input device continues to be assigned the function of select and the rocker switch is still used as a scrolling device. The display of the mobile telephone, however, display another menu list containing the functions "EDIT", "VIEW", "CALL", and "DELETE". Light pressure on assignable input device and rocker switch again produces the fourth and fifth tactile sensations, indicating that the "Phonebook" mode or function is still active. Using the rocker switch to scroll up or down through the list again produces a click in the rocker switch as each entry is passed. The magnitude of each click and the spacing between clicks can be varied to indicate that a relatively short list is being scrolled. In addition to a click, seventh, eighth, ninth and tenth distinct tactile sensations as output to the rocker switch as the switch scrolls past "EDIT", "VIEW", "CALL", and "DELETE" respectively. Scrolling is stopped on the "CALL" entry, and the assignable input device is pushed, calling the number associated with the chosen entry from the phonebook. In addition, the ninth tactile sensation is output to the assignable input device. An attempt to active one of the functions, such as "CALL", before the device is ready causes the controller to indicate that the function is available.

Various other functions may be initiated by using the buttons. For example, in a mobile telephone having the functionality of instant messaging, electronic mail, voice mail, games, and missed call read-out, the user may select one of these functions. In an embodiment, a distinct tactile sensation is initiated by the controller whenever the user initiates one of these functions, and the distinct tactile sensation is different for each function.

Regardless of the input device being monitored by the controller, upon detection of first and second input signals, first and second pressures or first and second positions and obtaining the associated first and second functions, the controller can determine if these functions are available for execution 58. Alternatively, the controller provides the necessary function signals to the electronic device which determines the availability of those functions. If the first and second functions are available, then the controller produces the associated tactile sensations in the appropriate input devices. If one of the first or second functions are not available then the controller obtains the tactile sensation information for the tactile sensation associated with function failure 59, Sensation 23, and produces that sensation in the appropriate input device. Examples of function failure include selecting the re-dial feature on a telephone when no number is stored in the re-dial memory, attempting to access a program or menu for which the user does not have authority to access, and attempting to initiate a mobile telephone call having entered an incomplete phone number.

Figure 11:
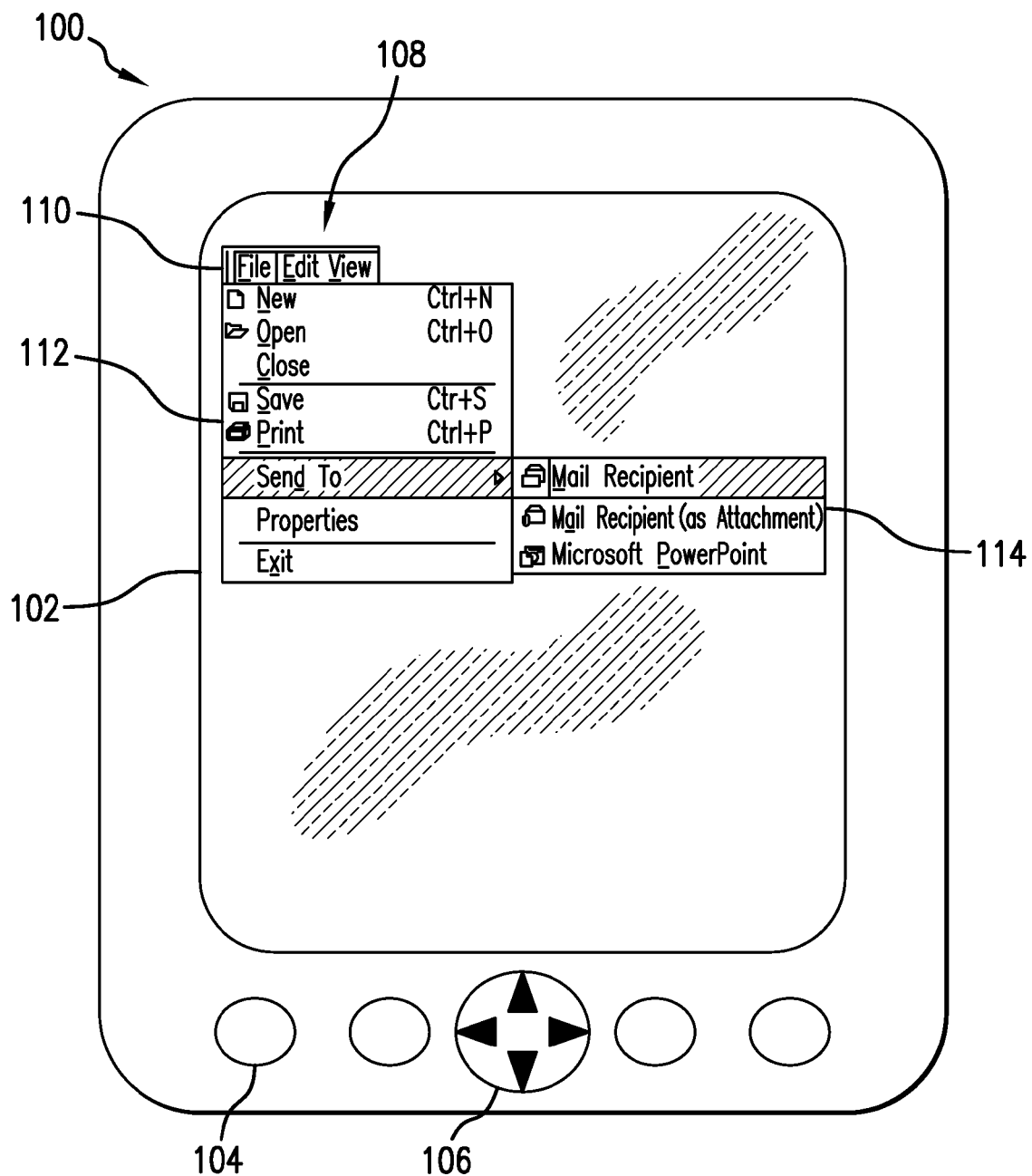
FIG. 11 shows a device for providing tactile sensations according to one embodiment of the present invention.

FIG. 11 aids in illustrating another embodiment of the present invention. In one embodiment of the present invention, a device provides haptic feedback while navigating a menu structure, allowing a user to navigate the menu structure more efficiently, preferably without having to refer to the visual display. In such an embodiment, an actuator generates distinct sensations that represent various sections of the menu structure, specific menu options, and events that occur while navigating the menu structure.

For example, in one embodiment, each of the highest level or main menu options corresponds to a distinct vibrotactile sensation that varies in pitch. As the user navigates between the main menu topics, the actuator produces a distinct number of pulses. The varying pitch combined with the alternating pulses provides feedback that identifies to the user the menu currently selected or highlighted.

In another embodiment, the number of occurrences of a distinct vibrotactile sensation, such as a pop, corresponds to the index number of the menu option within a list of menu options. In such an embodiment, one pop signifies the first option; two pops signifies the second option. In yet another embodiment, a distinct vibrotactile effect signifies that the user is cycling from the end of a particular menu back to the beginning ("rolling over").

FIG. 11 is a front view of a personal digital assistant (PDA) 100 in one such embodiment of the present invention. The PDA 100 includes a display 102, a plurality of buttons, including button 104, for executing specific functions and applications, and a 5-way directional pad (D-pad) 105 for navigation within the various interfaces displayed on the PDA 100. With the 5-way D-pad, a user clicks the directional keys to move up and down and left and right through the menu structure and clicks the center of the D-pad to select a particular option. In the embodiment shown, the active application is displaying a menu structure. The menu structure 108 includes main menu topics 110. Selection of the main menu topics results in either the display of a sub-menu or the execution of an associated function or application. In the embodiment shown, selection of the File menu option on the main menu 110 results in the display of a sub-menu 112. As with the main menu options, selection of any of the topics on the sub-menu 112 results in either the display of a secondary sub-menu or the execution of an associated function or application. For example, selection of the Send To option on sub-menu 112 results in display of secondary sub-menu 114.

In the embodiment shown in FIG. 11, a user presses button 104 to activate an application. Within the application, the user utilizes D-pad 106 to navigate to the main menu 108. An actuator (not shown) as described herein, such as an eccentric rotating mass or voicecoil, provides a brief, distinct haptic effect as the user highlights each of the options in the main menu 108. The effect may change in pitch or in some other manner to alert the user to the fact that the highlighted option has changed. The user may either click the center of the D-pad 106 to select an option or click the down arrow. Performing either of these actions over the File option produces sub-menu 112.

The user clicks the down arrow to move through the sub-menu 112. In the embodiment shown, when a directional arrow of the D-pad 106 is held down, the menu options in sub-menu 112 scroll at a fixed rate, and a haptic effect plays with each option that appears below the cursor. The longer the directional arrow is held down, the faster the rate of scrolling. The PDA 100 communicates the rate of scrolling by a corresponding change in the haptic effect, such as an increase in frequency. If the user clicks the right arrow when the cursor highlights the Send To option, the secondary sub-menu 114 is displayed. Navigation through the secondary sub-menu 114 occurs in a manner similar to that which occurs in sub-menu 112. To select an option within the secondary sub-menu 114, the user clicks the center of the D-pad 106. Clicking the center of the D-pad 106 triggers the playing of yet another distinct haptic effect. In addition, the D-pad switch 106, either a 5-way or a 4-way, can provide haptic effects indicating the direction that the switch was being pressed.

The embodiment shown in FIG. 11 is applicable to a variety of applications, particularly to applications that display lists. For example, in one embodiment, an address book containing a list of names is displayed on the PDA 100. In such an embodiment, the actuator plays an effect as the user scrolls through the list. Further, the actuator plays a distinct haptic effect as the user navigates from names starting with one letter, for example A, to the next letter, B. Such an embodiment may also include a distinct effect corresponding to names that the user has previously identified as favorites in the address book.

Another embodiment of the present invention provides the user with distinct haptic effects corresponding to the operational mode of an electronic device. For example, in an embodiment utilizing a PDA, such as PDA 31 in FIG. 5, a user may activate one of many modes, including, for example, the phone interface shown in FIG. 5, the application interface shown in FIG. 11, an address book, email, or other modes. Referring to FIG. 5, in one such embodiment, the user clicks a button 32 to activate the phone application. When the user clicks the button, the PDA 31 displays a phone interface 38. While the PDA 31 is in phone mode, the actuator provides a persistent haptic effect indicating to the user that the phone mode is active. In this way, the user is able to determine the mode of the PDA 31 without visually referring to it.

Another embodiment of the present invention provides the user with distinct haptic effects for modes within a cell phone or other electronic device. Referring to FIG. 3, users of cell phones, such as cell phone 14, often store a list of number that are frequently dialed in a memory associated with one or a combination of number keys 10. In such an embodiment, the user may click a function key before clicking the number key 10, providing a signal to the phone 31 that the user will specify a number to dial by clicking a number key combination. In one embodiment of the present invention, when the user clicks the function button, the actuator provides a persistent haptic effect, indicating to the user that the cell phone is in the rapid-dialing mode. The haptic effect alerts the user to the fact that when the user selects a number-key combination, the cell phone will dial the phone number associated with the number-key combination in memory. By providing a haptic effect identifying the mode that the cell phone 31 is in, the embodiment minimizes or eliminates the user's need to refer to the cell phone 31 visually.

In another embodiment of the present invention, an actuator provides feedback when an option or function is unavailable (referred to herein as "negative feedback"). In such an embodiment implemented in a cell phone, such as cell phone 31 shown in FIG. 3, the user is able to place calls. The user dials a combination of number keys 10 and then presses the send key 11 to execute the phone call. In an embodiment utilizing negative feedback, if the user enters an invalid phone number, for example, a phone number including only 6 digits, the cell phone provides negative feedback, indicating that the send function is not available. The negative feedback may, for example, comprise a very low frequency buzz. In another embodiment, the actuator provides negative feedback to the user if the user clicks a redial button (not shown) without having previously dialed a number.

Other embodiments and uses of the present invention will be apparent to those skilled in the art from consideration of this application and practice of the invention disclosed herein. The present description and examples should be considered exemplary only, with the true scope and spirit of the invention being indicated by the following claims. As will be understood by those of ordinary skill in the art, variations and modifications of each of the disclosed embodiments, including combinations thereof, can be made within the scope of this invention as defined by the following claims.

That which is claimed is:

1. A method, comprising:
    outputting a display signal configured to display a graphical object on a touch-sensitive input device;
    receiving a sensor signal from the touch-sensitive input device, the sensor signal indicating an object contacting the touch-sensitive input device and a pressure of the contact;
    determining an interaction between the object contacting the touch-sensitive input device and the graphical object based at least in part on the pressure;
    generating an actuator signal based at least in part on the interaction, wherein the actuator signal is configured to cause a first haptic effect if the pressure is less than a first pressure threshold and cause a second haptic effect if the pressure is between the first pressure threshold and a second pressure threshold; and
    outputting the actuator signal.

2. The method of claim 1, wherein the actuator signal is generated when the object contacts the touch-sensitive device at a location corresponding to the graphical object.

3. The method of claim 1, wherein the actuator signal is generated when the object contacts the touch-sensitive device at a location not corresponding to the graphical object.

4. The method of claim 1, wherein the display signal is configured to display a keypad comprising a plurality of softkeys.

5. The method of claim 4, wherein the haptic effect is caused to be output when a user contacts the touch-sensitive device at a location corresponding to a softkey in a home position.

6. The method of claim 4, wherein the plurality of softkeys comprises one softkey for each digit from 0 to 9.

7. The method of claim 4, wherein the plurality of softkeys comprises the key configuration of a standard 101-key keyboard.

8. The method of claim 1, wherein the graphical object comprises a first graphical object and a second graphical object, and
    if the object contacts the first graphical object, the first haptic effect is configured to be output if the pressure is less than the first pressure threshold and the second haptic effect is configured to be output if the pressure is between the first pressure threshold and the second pressure threshold, and
    if the object contacts the second graphical object a third haptic effect is configured to be output if the pressure is less than the first pressure threshold and a fourth haptic effect is configured to be output if the pressure is between the first pressure threshold and the second pressure threshold.

9. A system, comprising:
    a touch sensitive input device configured to output a sensor signal indicating an object contacting the touch-sensitive input device and a pressure of the contact;
    an actuator coupled to the touch-sensitive input device, the actuator configured to receive an actuator signal and output a haptic effect to the touch-sensitive surface based at least in part on the actuator signal, wherein the actuator signal is configured to cause a first haptic effect if the pressure is less than a first pressure threshold and cause a second haptic effect if the pressure is between the first pressure threshold and a second pressure threshold; and a processor in communication with the sensor and the actuator, the processor configured to:
output a display signal configured to display a graphical object on the touch-sensitive input device;
receive the sensor signal from the touch-sensitive input device;
determine an interaction between the object contacting the touch-sensitive surface and the graphical object based at least in part on the pressure,
generate the actuator signal based at least in part on the interaction; and
transmit the actuator signal to the actuator.

10. The system of claim 9, wherein the processor is configured to generate the actuator signal when the object contacts the touch-sensitive input device at a location corresponding to the graphical object.

11. The system of claim 9, wherein the processor is configured to output the actuator signal when the object contacts the touch-sensitive device at a location not corresponding to the graphical object.

12. The system of claim 9, wherein the display signal is configured to display a keypad comprising a plurality of softkeys.

13. The system of claim 12, wherein the haptic effect is caused to be output when a user contacts the touch-sensitive device at a location corresponding to a softkey in a home position.

14. The method of claim 12, wherein the plurality of softkeys comprises one softkey for each digit from 0 to 9.

15. The method of claim 12, wherein the plurality of softkeys comprises the key configuration of a standard 101-key keyboard.

16. The method of claim 9, wherein the graphical object comprises a first graphical object and a second graphical object, and
if the object contacts the first graphical object, the first haptic effect is configured to be output if the pressure is less than the first pressure threshold and the second haptic effect is configured to be output if the pressure is between the first pressure threshold and the second pressure threshold, and
if the object contacts the second graphical object a third haptic effect is configured to be output if the pressure is less than the first pressure threshold and a fourth haptic effect is configured to be output if the pressure is between the first pressure threshold and the second pressure threshold.

17. A computer-readable medium comprising program code, comprising:
program code for outputting a display signal configured to display a graphical object on a touch-sensitive input device;
program code for receiving a sensor signal from the touch-sensitive input device, the sensor signal indicating an object contacting the touch-sensitive input device and a pressure of the contact;
program code for determining an interaction between the object contacting the touch-sensitive input device and the graphical object based at least in part on the pressure;
program code for generating an actuator signal based at least in part on the interaction, the actuator signal configured to cause a haptic effect to be output, wherein the actuator signal is configured to cause a first haptic effect if the pressure is less than a first pressure threshold and cause a second haptic effect if the pressure is between the first pressure threshold and a second pressure threshold; and
program code for outputting the actuator signal.

18. The computer-readable medium of claim 17, wherein the actuator signal is generated when the object contacts the touch-sensitive device at a location corresponding to the graphical object.

19. The computer-readable medium of claim 17, wherein the actuator signal is generated when the object contacts the touch-sensitive device at a location not corresponding to the graphical object.

20. The computer-readable medium of claim 17, wherein the display signal is configured to display a keypad comprising a plurality of softkeys.

21. The computer-readable medium of claim 20, wherein the haptic effect is caused to be output when a user contacts the touch-sensitive device at a location corresponding to a softkey in a home position.

22. The computer-readable medium of claim 20, wherein the plurality of softkeys comprises one softkey for each digit from 0 to 9.

23. The computer-readable medium of claim 20, wherein the plurality of softkeys comprises the key configuration of a standard 101-key keyboard.

24. The computer-readable medium of claim 20, wherein the graphical object comprises a first graphical object and a second graphical object, and
if the object contacts the first graphical object, the first haptic effect is configured to be output if the pressure is less than the first pressure threshold and the second haptic effect is configured to be output if the pressure is between the first pressure threshold and the second pressure threshold, and
if the object contacts the second graphical object a third haptic effect is configured to be output if the pressure is less than the first pressure threshold and a fourth haptic effect is configured to be output if the pressure is between the first pressure threshold and the second pressure threshold.

25. An apparatus comprising:
at least one input device comprising a first position and a second position, the input device moveable to the first position upon application of a first pressure to the input device, and moveable to the second position upon application of a second pressure to the input device, the second pressure greater than the first pressure;
at least one actuator in communication with the input device, the actuator configured to output tactile sensations to the apparatus; and
at least one processor in communication with the input device, the processor configured to:
receive a first input signal from the input device, the first input signal associated with the first position,
receive a second input signal from the input device, the second input signal associated with the second position,
transmit a first actuator signal to the actuator, the first actuator signal configured to cause the actuator to output a first tactile sensation associated with the first position, and
transmit a second actuator signal to the actuator, the second actuator signal configured to cause the actuator to output a second tactile sensation associated with the second position;
wherein the input device comprises a pressure-sensitive touchpad, and the apparatus further comprises:

a display panel in communication with the pressure-sensitive touchpad, the display panel configured to receive the tactile sensations from the pressure-sensitive touchpad; and at least one software-generated button configured to be displayed on the display panel.

26. The apparatus of claim 25, wherein the touchpad comprises a pressure calculator to measure the distinct amount of pressure.

27. The apparatus of claim 25, further comprising:

an interface object configured to be used to contact a location on the display panel corresponding to the at least one software-generated button; and a pressure calculator to calculate an amount of pressure based upon an amount of area of the interface object in contact with the display panel.

28. The apparatus of claim 27, wherein the interface object comprises a stylus.

29. An apparatus comprising:

at least one input device comprising a first position and a second position, the input device moveable to the first position upon application of a first pressure to the input device, and moveable to the second position upon application of a second pressure to the input device, the second pressure greater than the first pressure;

at least one actuator in communication with the input device, the actuator configured to output tactile sensations to the apparatus; and at least one processor in communication with the input device, the processor configured to:

receive a first input signal from the input device, the first input signal associated with the first position, receive a second input signal from the input device, the second input signal associated with the second position, transmit a first actuator signal to the actuator, the first actuator signal configured to cause the actuator to output a first tactile sensation associated with the first position, and transmit a second actuator signal to the actuator, the second actuator signal configured to cause the actuator to output a second tactile sensation associated with the second position;

wherein the apparatus comprises at least one of a mobile telephone, a personal computer, or a hand-held computing device.

* * * * *